US012584755B2

(12) United States Patent
Nimura et al.

(10) Patent No.: US 12,584,755 B2
(45) Date of Patent: Mar. 24, 2026

(54) DRIVING ASSISTANCE DEVICE WITH OBSTACLE ADVOIDANCE OPERATION AND COMPUTER PROGRAM

(71) Applicant: AISIN CORPORATION, Kariya (JP)

(72) Inventors: Mitsuhiro Nimura, Kariya (JP); Hidenori Nagasaka, Kariya (JP); Keita Ogawa, Kariya (JP)

(73) Assignee: AISIN CORPORATION, Kariya (JP)

( * ) Notice: Subject to any disclaimer, the term of this patent is extended or adjusted under 35 U.S.C. 154(b) by 111 days.

(21) Appl. No.: 18/269,876

(22) PCT Filed: Mar. 16, 2022

(86) PCT No.: PCT/JP2022/012025
§ 371 (c)(1),
(2) Date: Jun. 27, 2023

(87) PCT Pub. No.: WO2022/209914
PCT Pub. Date: Oct. 6, 2022

(65) Prior Publication Data
US 2024/0318969 A1 Sep. 26, 2024

(30) Foreign Application Priority Data
Mar. 31, 2021 (JP) ................................. 2021-060742

(51) Int. Cl.
*G01C 21/34* (2006.01)
*B60W 30/09* (2012.01)
*B60W 60/00* (2020.01)

(52) U.S. Cl.
CPC ......... *G01C 21/3492* (2013.01); *B60W 30/09* (2013.01); *B60W 60/0016* (2020.02);
(Continued)

(58) Field of Classification Search
CPC .......... G01C 21/3492; B60W 60/0016; B60W 30/09; B60W 2552/53; B60W 2556/40; B60W 2554/80
See application file for complete search history.

(56) References Cited

U.S. PATENT DOCUMENTS

2019/0270448 A1 9/2019 Takasao
2020/0156538 A1 5/2020 Harper et al.
(Continued)

FOREIGN PATENT DOCUMENTS

JP 2017-117080 A 6/2017
JP 2019-151185 A 9/2019

OTHER PUBLICATIONS

International Search Report of PCT/JP2022/012025 dated May 31, 2022 [PCT/ISA/210].

*Primary Examiner* — Scott A Browne
*Assistant Examiner* — Terry C Buse
(74) *Attorney, Agent, or Firm* — Sughrue Mion, PLLC

(57) ABSTRACT

There are provided a driving assistance device and a computer program that provide appropriate driving assistance that does not place a burden on a passenger of a vehicle when an obstacle which becomes a factor that hinders travel of the vehicle is present on a planned travel route of the vehicle. Specifically, when an obstacle which becomes a factor that hinders travel of a vehicle is present on a planned travel route of the vehicle, a cost indicating a burden on a passenger is calculated for a plurality of candidates for avoidance operation for avoiding the obstacle, avoidance operation recommended to avoid the obstacle is selected from among the plurality of candidates for avoidance operation by comparing the calculated costs, a travel path recommended for the vehicle to travel along is generated in accordance with the selected avoidance operation, and driv-
(Continued)

ing assistance for the vehicle is provided based on the generated travel path.

4 Claims, 26 Drawing Sheets

(52) U.S. Cl.
CPC ..... *B60W 2552/53* (2020.02); *B60W 2554/80* (2020.02); *B60W 2556/40* (2020.02)

(56) References Cited

U.S. PATENT DOCUMENTS

2020/0346662 A1* 11/2020 Suzuki ............ B60W 60/00276
2020/0391731 A1* 12/2020 Cheon ................... B60W 10/18
2021/0163010 A1* 6/2021 Takabayashi ............ G08G 1/16

* cited by examiner

FIG. 3

Obstacle information

| Detection date and time | Type | Link | Lane No. | Area in which obstacle is located |
|---|---|---|---|---|
| 7/2 9:05 | Vehicle parked on road | 100001–20 | 1 | 0.2 m from left edge |
| 7/2 11:12 | Vehicle parked on road | 100013–30 | 1 | 0.5 m from left edge |
| 7/2 13:32 | Vehicle parked on road | 100101–50 | 1 | 0.4 m from left edge |
| ... | ... | ... | ... | ... |

To destination

Current location of
vehicle

FIG. 23

In case of road with two lanes in each direction

| | Avoidance action (1) (Movement within lane) | Avoidance action (2) (Lane drifting) | Avoidance action (3) (Lane change) |
|---|---|---|---|
| Cost based on travel time | +2.96 (Difference from T0 × 2) | ±0 (Difference from T0 × 2) | ±0 (Difference from T0 × 2) |
| Cost based on lane change | +0 (No movement into lane) | +1 (Drifting of part of vehicle body) | +2 (Complete change) |
| Cost based on level of risk | +1 (Level of risk "medium") | +2 (Level of risk "high") | +0 (Level of risk "low") |
| Total of costs | 3.96 | 3.0 | 2.0 |

⇧ Smallest

FIG. 24

In case of road with one lane in each direction

| | Avoidance action (1) (Movement within lane) | Avoidance action (2) (Lane drifting) | Avoidance action (3) (Lane change) |
|---|---|---|---|
| Cost based on travel time | +0.8 (Difference from T0 × 2) | ±0 (Difference from T0 × 2) | ±0 (Difference from T0 × 2) |
| Cost based on lane change | +0 (No movement into lane) | +1 (Drifting of part of vehicle body) | +2 (Complete change) |
| Cost based on level of risk | +0 (Level of risk "low") | +1 (Level of risk "medium") | +2 (Level of risk "high") |
| Total of costs | 0.8 | 2.0 | 4.0 |

⇧ Smallest

90

Appropriate vehicle-
to-vehicle distance

81

DRIVING ASSISTANCE DEVICE WITH OBSTACLE ADVOIDANCE OPERATION AND COMPUTER PROGRAM

CROSS REFERENCE TO RELATED APPLICATIONS

This application is a National Stage of International Application No. PCT/JP2022/012025, filed Mar. 16, 2022, claiming priority to Japanese Patent Application No. 2021-060742, filed Mar. 31, 2021, the entire contents of which are incorporated in their entirety.

TECHNICAL FIELD

The present disclosure relates to a driving assistance device and a computer program that provide driving assistance for a vehicle.

BACKGROUND ART

In recent years, as a vehicle's travel mode, an autonomous driving assistance system has been newly proposed that aids a user in driving a vehicle by performing some or all of user's driving operations by a vehicle side, in addition to manual travel in which the vehicle travels based on user's driving operations. In the autonomous driving assistance system, for example, a current location of the vehicle, a lane in which the vehicle travels, and the locations of other vehicles around the vehicle are detected whenever necessary, and vehicle control of steering, a drive source, a brake, etc., is autonomously performed so that the vehicle travels along a preset route.

In addition, when travel by autonomous driving assistance is performed, a travel path that is recommended for traveling is generated in advance for roads on which the vehicle travels, based on a planned travel route of the vehicle, map information, etc., and control is performed to allow the vehicle to travel along the generated travel path. When the above-described travel path is generated, particularly, when obstacles that hinder travel of the vehicle (e.g., vehicles parked on a road) are present on the planned travel route, a path that avoids those obstacles needs to be generated. For example, JP 2019-151185 A discloses a technique in which a vehicle includes a camera and millimeter-wave radar for detecting an obstacle present ahead thereof, and when an obstacle has been detected by those camera and millimeter-wave radar, it is determined whether the obstacle is avoidable by making a lane change or performing steering within a lane, and if the obstacle is avoidable, then avoidance operation is determined, and the vehicle is controlled.

CITATIONS LIST

Patent Literature

Patent Literature 1: JP 2019-151185 A (paragraphs 0023-0041)

SUMMARY OF THE DISCLOSURE

Technical Problems

Here, in the technique of the above-described Patent Literature 1, an obstacle is detected using the camera and millimeter-wave radar mounted on the vehicle, and after detecting an obstacle, an avoidance route for avoiding the obstacle is searched. However, a detection range of these camera and millimeter-wave radar is limited to an area near the vehicle, and thus, in a state in which the vehicle is traveling at normal travel speed, if an obstacle is detected and thereafter an avoidance route is searched, then the vehicle has only limited options for avoidance operation that can be taken, causing a problem that an avoidance route involving a sudden turn or sudden deceleration that places a burden on a passenger is selected.

The present disclosure is made to solve the above-described conventional problem, and provides a driving assistance device and a computer program in which when an obstacle which becomes a factor that hinders travel of a vehicle is present on a planned travel route of the vehicle, a recommended travel path for avoiding the obstacle can be generated at a stage at which the vehicle is located away from the obstacle, enabling provision of appropriate driving assistance that does not place a burden on a passenger of the vehicle.

Solutions to Problems

To provide the above-described driving assistance device and computer program, a driving assistance device according to the present disclosure includes: road conditions obtaining means for obtaining road conditions in a predetermined detection range around a vehicle; planned travel route obtaining means for obtaining a planned travel route on which a vehicle travels; obstacle information obtaining means for obtaining information on an obstacle that is present on a portion of the planned travel route outside the detection range and that becomes a factor that hinders travel of a vehicle; travel path generating means for generating a travel path, targeting a region including an area outside the detection range, and using map information including information about markings and the information on an obstacle, the travel path being recommended to avoid the obstacle upon traveling on the planned travel route; and driving assistance means for providing driving assistance for a vehicle, based on a travel path generated by the travel path generating means.

Note that the term "driving assistance" refers to a function of performing or aiding in at least one of driver's vehicle operations instead of a driver, or to provision of display guidance or voice guidance for assisting in driving.

In addition, the "information about markings" may be information that identifies the types or layout of markings themselves that mark off lanes, or may be information that identifies whether a lane change can be made between adjacent lanes, or may be information that directly or indirectly identifies the configurations of lanes.

In addition, the "obstacle" corresponds, for example, to a parked vehicle parked on a road, a sign or a fence placed on a construction site on a road, or a bump or a dip in a road surface. In addition, the obstacles may include not only stationary things but also moving things.

In addition, a computer program according to the present invention is a program that generates assistance information used for driving assistance to be provided on a vehicle. Specifically, a computer is caused to function as: road conditions obtaining means for obtaining road conditions in a predetermined detection range around a vehicle; planned travel route obtaining means for obtaining a planned travel route on which a vehicle travels; obstacle information obtaining means for obtaining information on an obstacle that is present on a portion of the planned travel route outside the detection range and that becomes a factor that hinders travel of a vehicle; travel path generating means for generating a travel path, targeting a region including an area outside the detection range, and using map information including information about markings and the information on an obstacle, the travel path being recommended to avoid the obstacle upon traveling on the planned travel route; and driving assistance means for providing driving assistance for a vehicle, based on a travel path generated by the travel path generating means.

Advantageous Effects of Various Aspects of the Disclosure

According to the driving assistance device and computer program according to the present disclosure that have the above-described configurations, when an obstacle which becomes a factor that hinders travel of the vehicle is present on a planned travel route of the vehicle, it becomes possible to generate a recommended travel path for avoiding the obstacle, at a stage at which the vehicle is located away from the obstacle. As a result, it becomes possible to provide appropriate driving assistance that does not place a burden on a passenger of the vehicle.

BRIEF DESCRIPTION OF DRAWINGS

FIG. 3 is a diagram showing an example of obstacle information.

FIG. 23 is a diagram showing an example of costs calculated for each candidate for avoidance operation when a road having an obstacle is a road with two lanes in each direction.

FIG. 24 is a diagram showing an example of costs calculated for each candidate for avoidance operation when a road having an obstacle is a road with one lane in each direction.

DESCRIPTION OF EMBODIMENTS

Figure 1:
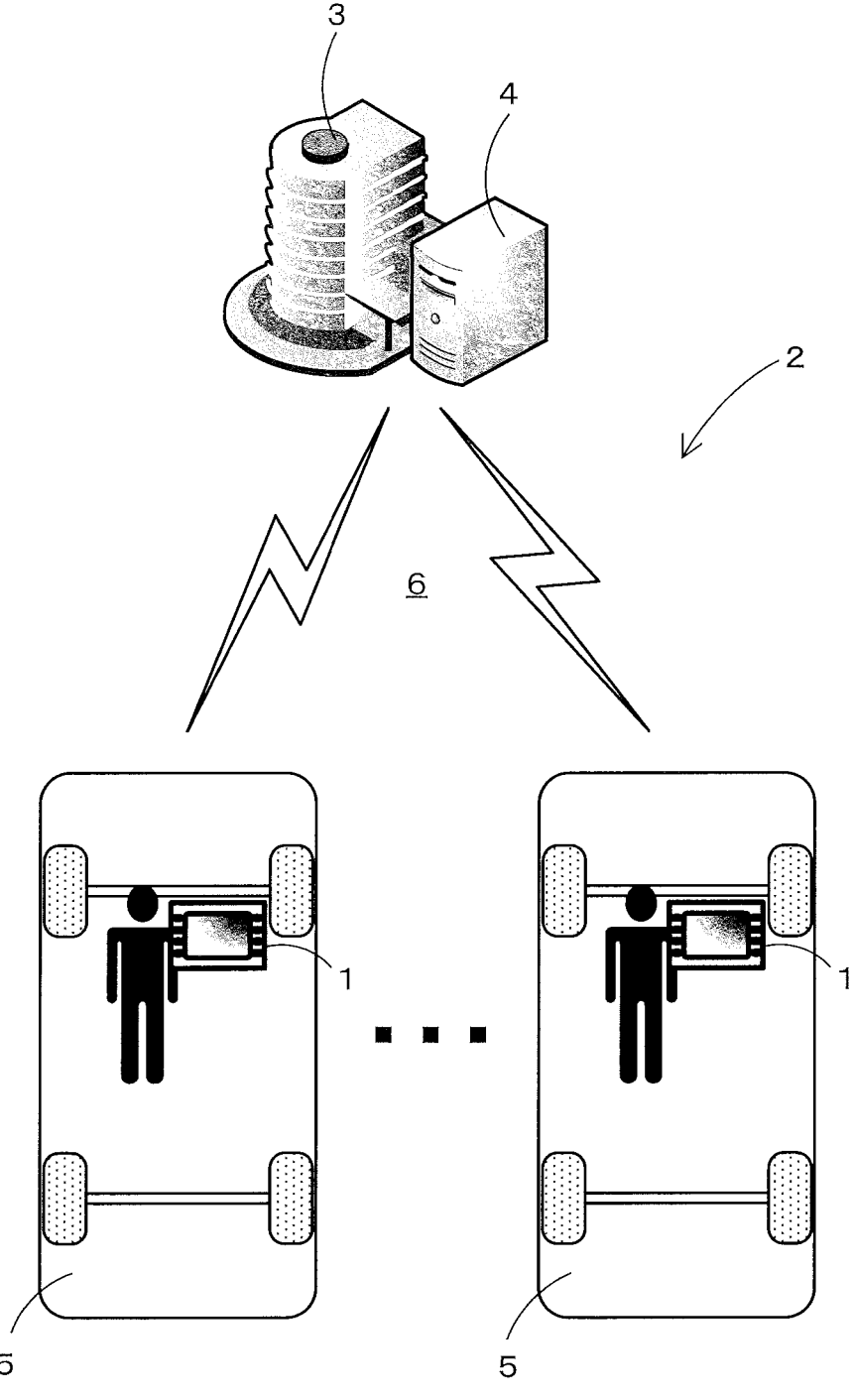
FIG. 1 is a schematic configuration diagram showing a driving assistance system according to the present embodiment.
Figure 2:
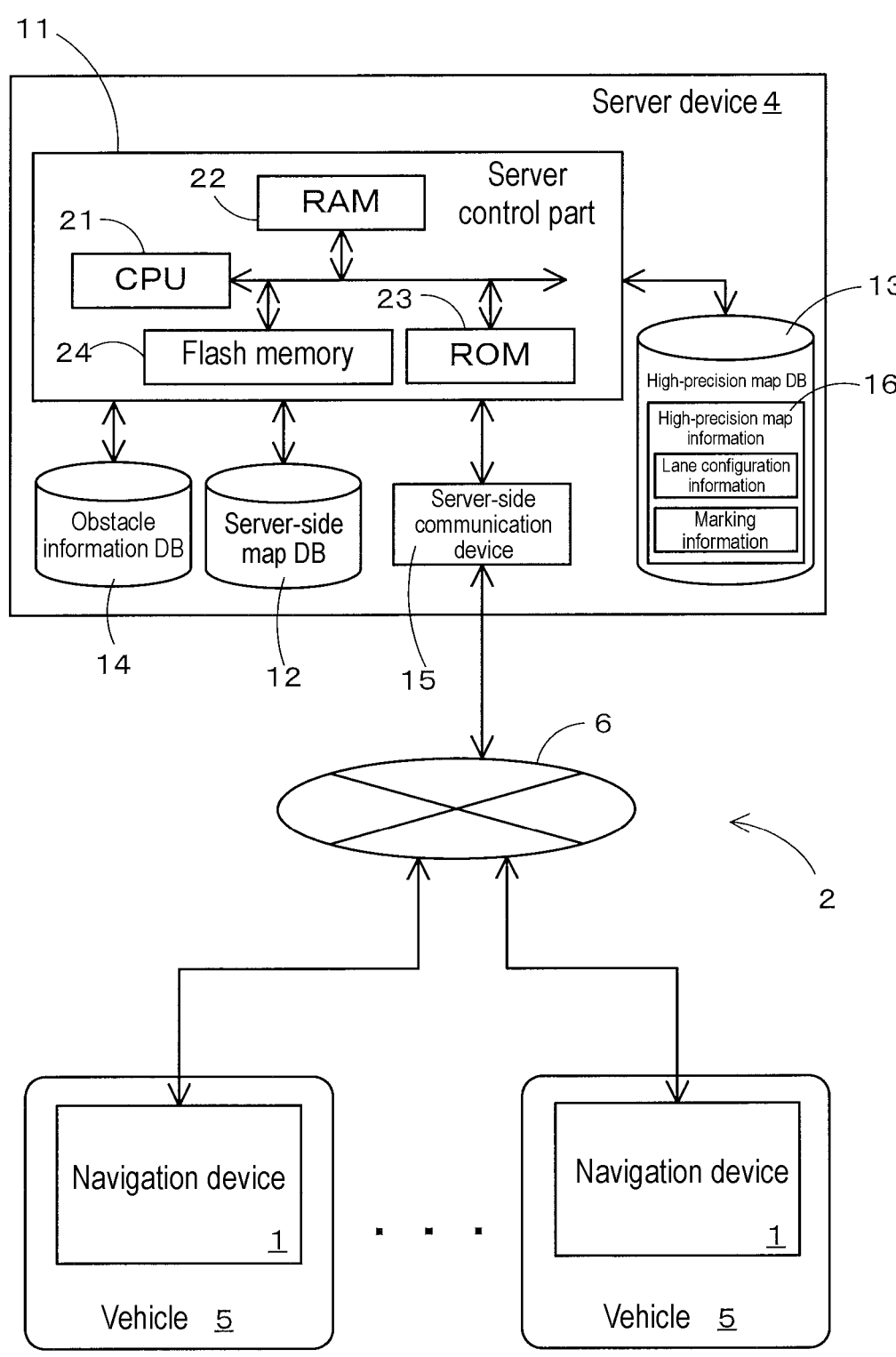
FIG. 2 is a block diagram showing a configuration of the driving assistance system according to the present embodiment.

One embodiment in which a driving assistance device according to the present disclosure is embodied into a navigation device 1 will be described in detail below with reference to the drawings. First, a schematic configuration of a driving assistance system 2 including navigation devices 1 according to the present embodiment will be described using FIGS. 1 and 2. FIG. 1 is a schematic configuration diagram showing the driving assistance system 2 according to the present embodiment. FIG. 2 is a block diagram showing a configuration of the driving assistance system 2 according to the present embodiment.

As shown in FIG. 1, the driving assistance system 2 according to the present embodiment basically includes a server device 4 provided in an information delivery center 3; and navigation devices 1 each mounted on a vehicle 5 to provide various types of assistance related to autonomous driving of the vehicle 5. In addition, the server device 4 and the navigation devices 1 are configured to be able to perform transmission and reception of electronic data with each other through a communication network 6. Note that instead of the navigation device 1, other in-vehicle devices mounted on the vehicle 5 or a vehicle control device that performs control for the vehicle 5 may be used.

Here, the vehicle 5 is a vehicle that can perform assistance travel by autonomous driving assistance in which the vehicle autonomously travels on a preset route or along a road independently of user's driving operations, in addition to manual driving travel in which the vehicle travels based on user's driving operations.

In addition, a configuration may be adopted in which autonomous driving assistance is provided for all road sections or is provided only while the vehicle travels on a specific road section (e.g., an expressway having a gate (it does not matter whether or not there is a person or whether or not a toll is collected) at a boundary). The following description is made assuming that an autonomous driving section in which autonomous driving assistance for the vehicle is provided also includes parking lots in addition to all road sections including general roads and expressways, and that autonomous driving assistance is basically provided during a period from when the vehicle starts traveling until the vehicle finishes traveling (until the vehicle is parked). Note, however, that it is desirable that instead of always providing autonomous driving assistance when the vehicle travels on an autonomous driving section, autonomous driving assistance be provided only in a situation in which provision of autonomous driving assistance is selected by a user (e.g., an autonomous driving start button is turned on) and it is determined that travel by autonomous driving assistance can be performed. On the other hand, the vehicle 5 may be a vehicle that can only perform assistance travel by autonomous driving assistance.

In vehicle control performed by autonomous driving assistance, for example, a current location of the vehicle, a lane in which the vehicle travels, and the location of an obstacle around the vehicle are detected whenever necessary, and as will be described later, vehicle control of steering, a drive source, a brake, etc., is autonomously performed so that the vehicle travels along a travel path generated by the navigation device 1 and at a speed in accordance with a speed plan created likewise. Note that in assistance travel by autonomous driving assistance of the present embodiment, for a lane change, a left or right turn, and a parking operation, too, travel is performed by performing the above-described vehicle control by autonomous driving assistance, but a configuration may be adopted in which special travel such as a lane change, a left or right turn, and a parking operation is performed by manual driving instead of performing travel by autonomous driving assistance.

Meanwhile, the navigation device 1 is an in-vehicle device mounted on the vehicle 5 to display a map of an area around the location of the vehicle 5 based on map data included in the navigation device 1 or map data and obstacle information obtained from an external source, or to perform user's input of a destination, or to display a current location of the vehicle on a map image, or to provide guidance on movement along a set guidance route. In the present embodiment, particularly, when the vehicle performs assistance travel by autonomous driving assistance, various types of assistance information about the autonomous driving assistance are generated. The assistance information includes, for example, a travel path recommended for the vehicle to travel along (including a recommended way of moving into lanes), selection of a parking location where the vehicle is parked at a destination, and a speed plan indicating vehicle speed used upon traveling. Note that details of the navigation device 1 will be described later.

In addition, the server device 4 is an information management server that collects and accumulates probe information (material information), as appropriate, that includes a current time, travel information, etc., from each vehicle traveling across the country, and generates various types of assistance information about roads (e.g., road closure information, obstacle information, traffic accident information, traffic congestion information, and trip time) from the accumulated probe information, and delivers the generated assistance information to the navigation devices 1 or performs various processes using the assistance information. Particularly, in the present embodiment, the server device 4 collects, from each vehicle 5, the coordinates of a current location of the vehicle 5, vehicle speed, and a captured image obtained by capturing an area around the vehicle 5 with an in-vehicle camera provided in the vehicle 5, and performs statistics or analysis on each piece of the collected information, thereby generating data (obstacle information) about obstacles that are present on roads and become factors that hinder travel of the vehicles, and delivers the data to the vehicles 5. Note that that the obstacles correspond, for example, to parked vehicles parked on roads, signs and fences placed on construction sites on roads, and bumps and dips in road surfaces.

In addition, the server device 4 also performs a route search in response to a request from a navigation device 1. Specifically, information required for a route search such as a point of departure and a destination is transmitted together with a route search request from a navigation device 1 to the server device 4 (note, however, that in a case of re-searching, information about a destination does not necessarily need to be transmitted). Then, the server device 4 having received the route search request performs a route search using map information included in the server device 4, to identify a recommended route from the point of departure to the destination. Thereafter, the identified recommended route is transmitted to the navigation device 1 which is a source of the request. The navigation device 1 can provide a user with information about the received recommended route or can also generate, using the recommended route, various types of assistance information about autonomous driving assistance as will be described later.

Furthermore, the server device 4 includes high-precision map information which is map information with higher precision, separately from normal map information used for the above-described route search. The high-precision map information includes, for example, information about the lane configurations of roads (lane-by-lane road configurations, curvatures, lane widths, etc.) and markings (center-lines, lane lines, edge lines, guidelines, etc.) painted on the roads. In addition to the information, information about intersections, information about parking lots, etc., are also included. In response to a request from a navigation device 1, the server device 4 delivers the above-described obstacle information and high-precision map information, and the navigation device 1 generates various types of assistance information about autonomous driving assistance as will be described later, using the obstacle information and high-precision map information delivered from the server device 4. Note that the high-precision map information is basically map information targeting only a road (link) and an area around the road, but may be map information that also includes an area other than the area around the road.

Note, however, that the above-described route search process does not necessarily need to be performed by the server device 4, and if a navigation device 1 has map information, then the navigation device 1 may perform the route search process. In addition, high-precision map information may be included in advance in the navigation device 1, instead of being delivered from the server device 4.

In addition, the communication network 6 includes multiple base stations disposed all over the country; and telecommunications companies that manage and control their base stations, and is formed by connecting the base stations to the telecommunications companies by wire (optical fiber, ISDN, etc.) or wirelessly. Here, the base stations each include a transceiver and an antenna that perform communication with navigation devices 1. While the base station performs radio communication with a telecommunications company, the base station serves as an end of the communication network 6 and plays a role in relaying communication of navigation devices 1 present in an area (cell) where radio waves from the base station reach, to the server device 4.

Next, a configuration of the server device 4 in the driving assistance system 2 will be described in more detail using FIG. 2. The server device 4 includes, as shown in FIG. 2, a server control part 11, a server-side map DB 12 connected to the server control part 11 and serving as information recording means, a high-precision map DB 13, an obstacle information DB 14, and a server-side communication device 15.

The server control part 11 is a control unit (an MCU, an MPU, etc.) that performs overall control of the server device 4, and includes a CPU 21 serving as a computing device and a control device; and internal storage devices such as a RAM 22 used as a working memory when the CPU 21 performs various types of arithmetic processing, a ROM 23 having recorded therein a program for control, etc., and a flash memory 24 that stores a program read from the ROM 23. Note that the server control part 11 includes various types of means serving as processing algorithms with an ECU of a navigation device 1 which will be described later.

Meanwhile, the server-side map DB 12 is storage means for storing server-side map information which is the latest version of map information registered based on input data from an external source and input operations. Here, the server-side map information includes a road network and various types of information required for a route search, route guidance, and map display. For example, there are included network data including nodes and links that indicate a road network, link data about roads (links), node data about node points, intersection data about each intersection, point data about points such as facilities, map display data for displaying a map, search data for searching for a route, and retrieval data for retrieving a point.

In addition, the high-precision map DB 13 is storage means for storing high-precision map information 16 which is map information with higher precision than the above-described server-side map information. The high-precision map information 16 is, particularly, map information that stores more detailed information about roads, parking lots, etc., where vehicles are to travel. In the present embodiment, the high-precision map information 16 includes, for example, for roads, information about lane configurations (lane-by-lane road configurations, curvatures, lane widths, etc.) and markings (centerlines, lane lines, edge lines, guidelines, etc.) painted on the roads. Furthermore, the high-precision map information 16 records data representing road gradients, cants, banks, merge areas, a location where the number of lanes decreases, a location where road width becomes narrower, railroad crossings, etc., and records: for a corner, data representing the radius of curvature, an intersection, a T-junction, the entry and exit of the corner, etc.; for road attributes, data representing downhill slopes, uphill slopes, etc.; and for the types of road, data representing general roads such as national highways, prefectural highways, and narrow streets, and toll roads such as national expressways, urban expressways, automobile roads, general toll roads, and toll bridges. Particularly, in the present embodiment, there is also stored information that identifies, in addition to the number of lanes on a road, a passage segment in a traveling direction for each lane and a connection between roads for each lane (specifically, a correspondence between a lane included in a road before passing through an intersection and a lane included in a road after passing through the intersection). Furthermore, there is also stored speed limits set for roads. In addition, the high-precision map information is basically map information targeting only a road (link) and an area around the road, but may be map information that also includes an area other than the area around the road. In addition, although in the example shown in FIG. 2, the server-side map information stored in the server-side map DB 12 and the high-precision map information 16 are different pieces of map information, the high-precision map information 16 may be a part of the server-side map information.

Meanwhile, the obstacle information DB 14 is storage means for cumulatively storing information (obstacle information) about obstacles that is generated by performing statistics or analysis on probe information collected from each vehicle. Note that the obstacles are obstacles which become factors that hinder travel of vehicles traveling on roads and correspond, for example, to parked vehicles parked on roads, signs and fences placed on construction sites on roads, and bumps and dips in road surfaces. Note that in the present embodiment, probe information collected from vehicles includes, particularly, (a) results of detecting obstacles using in-vehicle cameras and other sensors provided in the vehicles and (b) the coordinates of locations and vehicle speeds of the vehicles. By performing statistics or analysis on those pieces of probe information, the types and locations of obstacles present on roads across the country are managed by a server device 4 side and stored in the obstacle information DB 14. Note, however, that information about obstacles may be obtained from information other than probe information.

FIG. 3 is a diagram showing an example of obstacle information stored in the obstacle information DB 14. As shown in FIG. 3, the obstacle information includes information that identifies the date and time on which an obstacle is detected; the type of the obstacle; and information that identifies the location of the obstacle. Furthermore, the location of the obstacle is identified by a link ID of a link where the obstacle is located, the distance from a starting point of the link, a lane in which the obstacle is located, and an area in which the obstacle is located within the lane. For example, the example shown in FIG. 3 shows that a parked vehicle is located at a location 20 m from a starting point of a link with the link ID "100001" and in an area extending 0.2 m from a left edge of a far left lane. In addition, there is shown that a parked vehicle is located at a location 30 m from a starting point of a link with the link ID "100013" and in an area extending 0.5 m from a left edge of a far left lane. In addition, there is shown that a parked vehicle is located at a location 50 m from a starting point of a link with the link ID "100101" and in an area extending 0.4 m from a left edge of a far left lane. Note that the "lane No." defines, for example, a plurality of lanes included in a link, as 1, 2, 3 . . . in turn from the left.

In response to a request from a navigation device 1, the server device 4 delivers obstacle information stored in the obstacle information DB 14 to the navigation device 1. On the other hand, the navigation device 1 to which the obstacle information has been delivered generates various types of assistance information about autonomous driving assistance as will be described later, using the delivered obstacle information.

Meanwhile, the server-side communication device 15 is a communication device for performing communication with the navigation device 1 of each vehicle 5 through the communication network 6. In addition, besides the navigation devices 1, it is also possible to receive traffic information including pieces of information such as traffic congestion information, regulation information, and traffic accident information that are transmitted from an Internet network, traffic information centers, e.g., a VICS (registered trademark: Vehicle Information and Communication System) center, etc.

Figure 4:
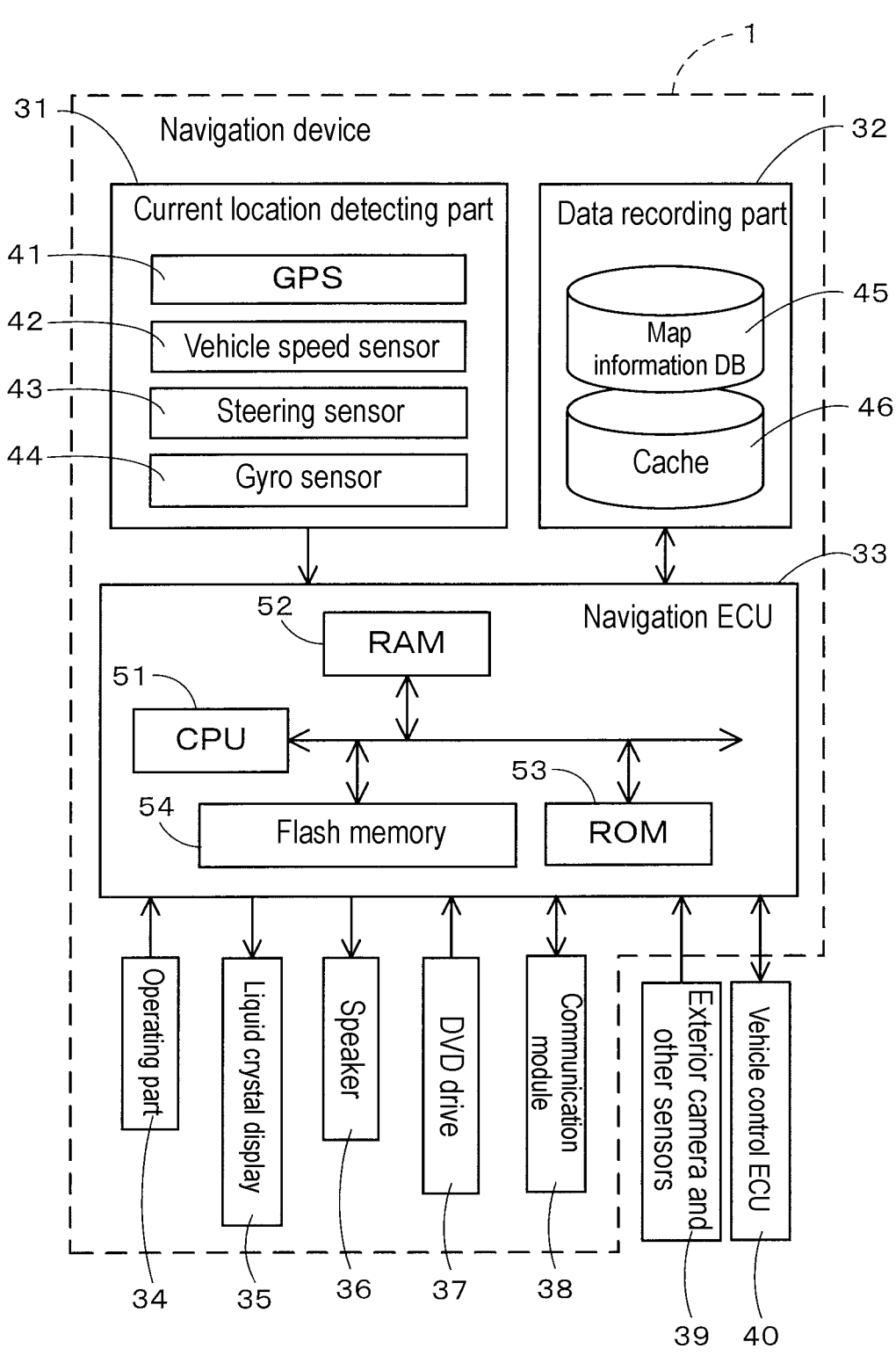
FIG. 4 is a block diagram showing a navigation device according to the present embodiment.

Next, a schematic configuration of the navigation device 1 mounted on the vehicle 5 will be described using FIG. 4. FIG. 4 is a block diagram showing the navigation device 1 according to the present embodiment.

As shown in FIG. 4, the navigation device 1 according to the present embodiment includes a current location detecting part 31 that detects a current location of the vehicle having the navigation device 1 mounted thereon; a data recording part 32 having various types of data recorded therein; a navigation ECU 33 that performs various types of arithmetic processing based on inputted information; an operating part 34 that accepts operations from a user; a liquid crystal display 35 that displays to the user a map of an area around the vehicle, information about a guidance route (a planned travel route of the vehicle) set on the navigation device 1, etc.; a speaker 36 that outputs voice guidance about route guidance; a DVD drive 37 that reads a DVD which is a storage medium; and a communication module 38 that performs communication with information centers such as a probe center and a VICS center. In addition, an exterior camera 39 and various types of sensors that are installed on the vehicle having the navigation device 1 mounted thereon are connected to the navigation device 1 through an in-vehicle network such as a CAN. Furthermore, the navigation device 1 is also connected to a vehicle control ECU 40 that performs various types of control on the vehicle having the navigation device 1 mounted thereon, such that the navigation device 1 and the vehicle control ECU 40 can perform two-way communication.

The components included in the navigation device 1 will be described in turn below.

The current location detecting part 31 includes a GPS 41, a vehicle speed sensor 42, a steering sensor 43, a gyro sensor 44, etc., and can detect the current vehicle location and orientation, a travel speed of the vehicle, a current time, etc. Here, particularly, the vehicle speed sensor 42 is a sensor for detecting the moving distance and vehicle speed of the vehicle, and generates pulses according to the rotation of drive wheels of the vehicle and outputs a pulse signal to the navigation ECU 33. Then, the navigation ECU 33 counts the generated pulses, thereby calculating the rotational speed of the drive wheels and a moving distance. Note that the navigation device 1 does not need to include all of the above-described four types of sensors, and may be configured to include only one or a plurality of types of sensors among these sensors.

In addition, the data recording part 32 includes a hard disk (not shown) serving as an external storage device and a recording medium; and a recording head (not shown) which is a driver for reading a map information DB 45 recorded on the hard disk, a cache 46, a predetermined program, etc., and for writing predetermined data to the hard disk. Note that the data recording part 32 may include a flash memory, a memory card, or an optical disc such as a CD or a DVD, instead of a hard disk. In addition, in the present embodiment, as described above, the server device 4 searches for a route to a destination, and thus, the map information DB 45 may be omitted. Even if the map information DB 45 is omitted, it is also possible to obtain map information from the server device 4 as necessary.

Here, the map information DB 45 is storage means having stored therein, for example, link data about roads (links), node data about node points, search data used in processes related to a route search or change, facility data about facilities, map display data for displaying a map, intersection data about each intersection, and retrieval data for retrieving a point.

Meanwhile, the cache 46 is storage means for saving high-precision map information 16 and obstacle information that have been delivered from the server device 4 in the past. A saving period can be set as appropriate, and may be, for example, a predetermined period (e.g., one month) after storage or a period until an ACC power supply (accessory power supply) of the vehicle is turned off. In addition, after the amount of data stored in the cache 46 reaches an upper limit, the data may be sequentially deleted in order of oldest to newest. The navigation ECU 33 generates various types of assistance information about autonomous driving assistance, using the high-precision map information 16 and obstacle information stored in the cache 46. Details will be described later.

Meanwhile, the navigation ECU (electronic control unit) 33 is an electronic control unit that performs overall control of the navigation device 1, and includes a CPU 51 serving as a computing device and a control device; and internal storage devices such as a RAM 52 that is used as a working memory when the CPU 51 performs various types of arithmetic processing and that stores route data obtained when a route is searched, etc., a ROM 53 having recorded therein a program for control, an autonomous driving assistance program (see FIG. 5) which will be described later, etc., and a flash memory 54 that stores a program read from the ROM 53. Note that the navigation ECU 33 includes various types of means serving as processing algorithms. For example, road conditions obtaining means obtains road conditions in a predetermined detection range around the vehicle. Planned travel route obtaining means obtains a planned travel route on which the vehicle travels. Obstacle information obtaining means obtains information on an obstacle that is present on a portion of the planned travel route outside the detection range and that becomes a factor that hinders travel of the vehicle. Travel path generating means generates a travel path, targeting a region including an area outside the detection range, and using map information including information about markings and the information on an obstacle, the travel path being recommended to avoid the obstacle upon traveling on the planned travel route. Driving assistance means provides driving assistance for the vehicle, based on the generated travel path.

The operating part 34 is operated, for example, upon inputting a point of departure which is a travel start point and a destination which is a travel end point, and includes a plurality of operating switches such as various types of keys and buttons (not shown). Based on a switch signal outputted by, for example, depression of a given switch, the navigation ECU 33 performs control to perform a corresponding one of various types of operation. Note that the operating part 34 may include a touch panel provided on the front of the liquid crystal display 35. Note also that the operating part 34 may include a microphone and a voice recognition device.

In addition, on the liquid crystal display 35 there are displayed a map image including roads, traffic information, operation guidance, an operation menu, guidance on keys, information on guidance along a guidance route (planned travel route), news, weather forecasts, time, e-mails, TV programs, etc. Note that instead of the liquid crystal display 35, a HUD or an HMD may be used.

In addition, the speaker 36 outputs voice guidance that provides guidance on travel along a guidance route (planned travel route) or guidance on traffic information, based on an instruction from the navigation ECU 33.

In addition, the DVD drive 37 is a drive that can read data recorded on a recording medium such as a DVD or a CD. Based on the read data, for example, music or video is played back or the map information DB 45 is updated. Note that instead of the DVD drive 37, a card slot for performing reading and writing on a memory card may be provided.

In addition, the communication module 38 is a communication device for receiving traffic information, probe information, weather information, etc., that are transmitted from traffic information centers, e.g., a VICS center and a probe center, and corresponds, for example, to a mobile phone or a DCM. In addition, the communication module 38 also includes a vehicle-to-vehicle communication device that performs communication between vehicles and a roadside-device-to-vehicle communication device that performs communication with a roadside device. In addition, the communication module 38 is also used to transmit and receive route information searched by the server device 4, high-precision map information 16, obstacle information, etc., to/from the server device 4.

In addition, the exterior camera 39 includes, for example, a camera that uses a solid-state imaging device such as a CCD, and is attached to the upper side of a front bumper of the vehicle and is placed such that an optical-axis direction faces downward at a predetermined angle relative to the horizontal. When the vehicle travels on an autonomous driving section, the exterior camera 39 captures an image of an area ahead in a traveling direction of the vehicle. In addition, the navigation ECU 33 performs image processing on the captured image having been captured, thereby detecting markings painted on a road on which the vehicle travels, and obstacles. Furthermore, when an obstacle which becomes a factor that hinders travel of the vehicle, such as a parked vehicle parked on a road and around the vehicle, a sign or a fence placed on a construction site on a road, or a bump or a dip in a road surface, has been detected, information that identifies the location and type of the detected obstacle is transmitted as probe information to the server device 4. On the other hand, various types of new assistance information about autonomous driving assistance are also generated based on a result of the detection of the obstacle. For example, when an obstacle (including also a traveling lead vehicle, etc., that are not transmitted as probe information) has been newly detected on a current travel path, a new travel path where the vehicle travels avoiding or following the obstacle is generated. Note that the exterior camera 39 may be configured to be disposed on the rear or side of the vehicle other than the front. Note also that for means for detecting obstacles, a sensor such as millimeter-wave radar or a laser sensor, vehicle-to-vehicle communication, or roadside-device-to-vehicle communication may be used instead of a camera.

In addition, the vehicle control ECU 40 is an electronic control unit that controls the vehicle having the navigation device 1 mounted thereon. In addition, driving parts of the vehicle such as steering, a brake, and an accelerator are connected to the vehicle control ECU 40, and in the present embodiment, particularly, after the vehicle starts autonomous driving assistance, each driving part is controlled, by which autonomous driving assistance for the vehicle is provided. In addition, when an override has been performed by the user during autonomous driving assistance, the fact that the override has been performed is detected.

Here, the navigation ECU 33 transmits various types of assistance information about autonomous driving assistance generated by the navigation device 1 to the vehicle control ECU 40 through the CAN after starting traveling. Then, the vehicle control ECU 40 provides autonomous driving assistance to be provided after starting traveling, using the received various types of assistance information. The assistance information includes, for example, a travel path recommended for the vehicle to travel along and a speed plan indicating vehicle speed at which the vehicle travels.

Figure 5:
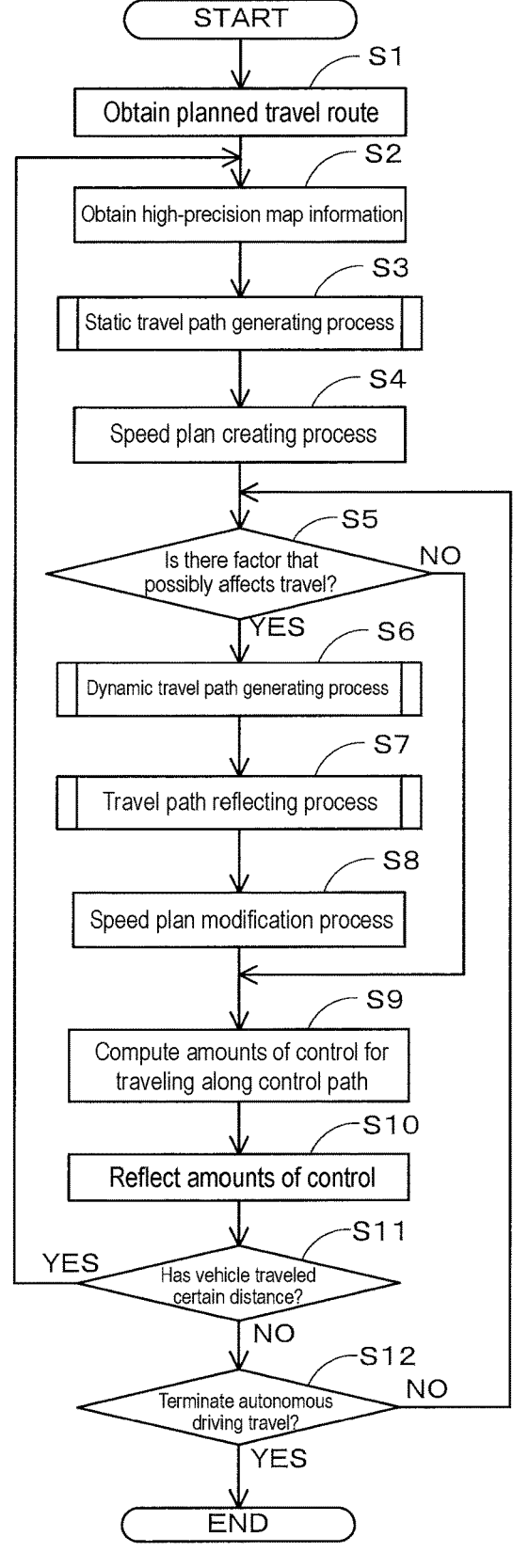
FIG. 5 is a flowchart of an autonomous driving assistance program according to the present embodiment.

Next, an autonomous driving assistance program executed by the CPU 51 of the navigation device 1 according to the present embodiment that has the above-described configuration will be described based on FIG. 5. FIG. 5 is a flowchart of the autonomous driving assistance program according to the present embodiment. Here, the autonomous driving assistance program is a program that is executed after the ACC power supply (accessory power supply) of the vehicle is turned on and when travel of the vehicle by autonomous driving assistance has started, and that performs assistance travel by autonomous driving assistance in accordance with assistance information generated by the navigation device 1. In addition, programs shown in flowcharts of the following FIGS. 5, 7, 13, 15, 20 to 22, 25, and 28 are stored in the RAM 52 or the ROM 53 included in the navigation device 1, and are executed by the CPU 51.

First, in the autonomous driving assistance program, at step (hereinafter, abbreviated as S) 1, the CPU 51 obtains a route on which the vehicle is planned to travel in the future (hereinafter, referred to as planned travel route). Note that the planned travel route of the vehicle is, for example, a recommended route to a destination that is searched by the server device 4 by the user setting the destination. Note that when a destination is not set, a route on which the vehicle travels along a road from a current location of the vehicle may be a planned travel route.

In addition, when a recommended route is searched, first, the CPU 51 transmits a route search request to the server device 4. Note that the route search request includes a terminal ID that identifies the navigation device 1 which is a sender of the route search request; and information that identifies a point of departure (e.g., a current location of the vehicle) and a destination. Note that upon re-searching, information that identifies a destination is not necessarily needed. Thereafter, the CPU 51 receives searched-route information transmitted from the server device 4 in response to the route search request. The searched-route information is information that identifies a recommended route (center route) from the point of departure to the destination (e.g., a series of links included in the recommended route) which is searched by the server device 4 based on the transmitted route search request and using the latest version of map information. The search is performed using, for example, the publicly known Dijkstra's algorithm.

Note that in the above-described search for a recommended route, it is desirable to select a parking location (parking space) recommended to park the vehicle in a parking lot at the destination, and search for a recommended route to the selected parking location. Namely, it is desirable that a recommended route to be searched also include a route representing movement of the vehicle in the parking lot, in addition to a route to the parking lot. In addition, for the selection of a parking location, it is desirable to select a parking location that reduces a user's burden, taking into account also movement on foot after parking the vehicle, in addition to movement of the vehicle to the parking location.

Then, at S2, the CPU 51 obtains high-precision map information 16, targeting a section within a predetermined distance from the current location of the vehicle along the planned travel route which is obtained at the above-described S1. For example, high-precision map information 16 is obtained targeting a portion of the planned travel route included in a secondary mesh in which the vehicle is currently located. Note, however, that an area for which high-precision map information 16 is to be obtained can be changed as appropriate, and for example, high-precision map information 16 for an area within 3 km from the current location of the vehicle along the planned travel route may be obtained. In addition, high-precision map information 16 may be obtained targeting the entire planned travel route.

Figure 6:
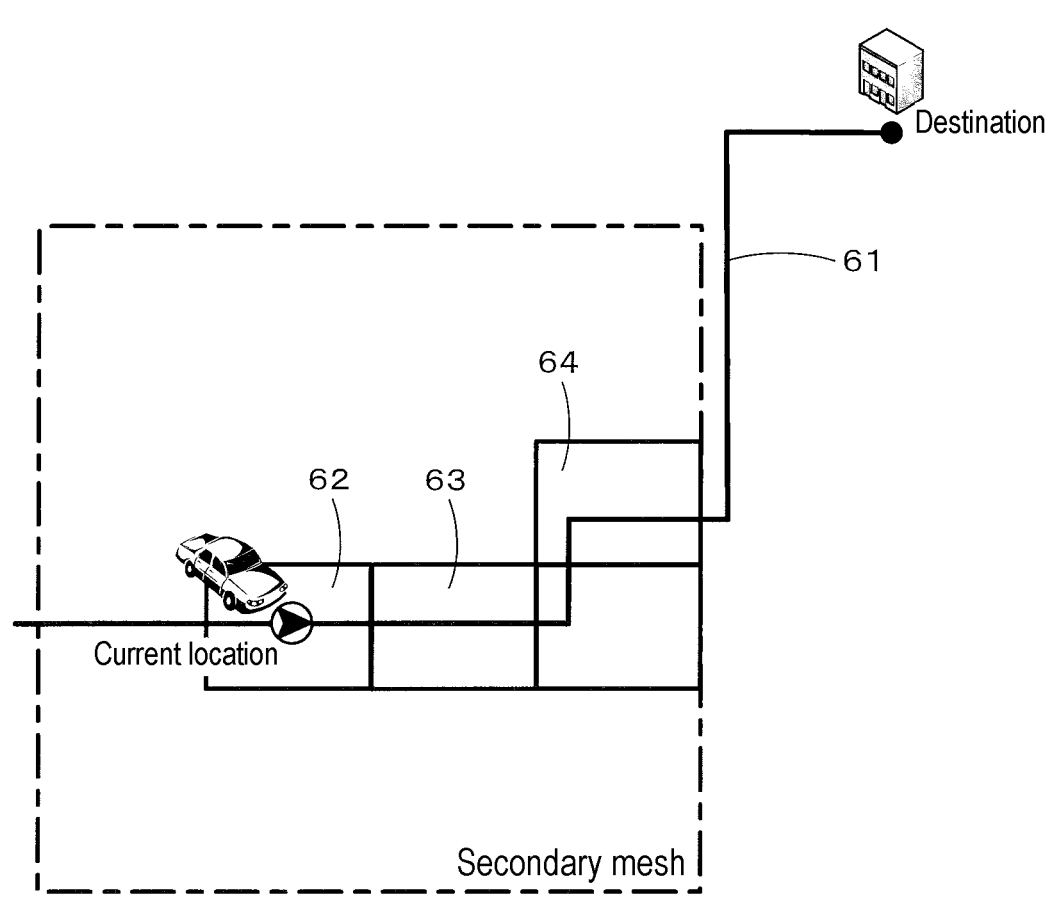
FIG. 6 is a diagram showing an area for which high-precision map information is obtained.

Here, the high-precision map information 16 is, as shown in FIG. 6, sectioned into rectangular shapes (e.g., 500 m×1 km) and stored in the high-precision map DB 13 of the server device 4. Thus, for example, when a planned travel route 61 is obtained as shown in FIG. 6, high-precision map information 16 is obtained targeting areas 62 to 64 that include a portion of the planned travel route 61 included in a secondary mesh including a current location of the vehicle. The high-precision map information 16 includes, for example, information about the lane configurations of roads, lane widths, and markings (centerlines, lane lines, edge lines, guidelines, etc.) painted on the roads. In addition to the information, information about intersections, information about parking lots, etc., are also included.

In addition, the high-precision map information 16 is basically obtained from the server device 4, but when there is high-precision map information 16 for areas that is already stored in the cache 46, the high-precision map information 16 is obtained from the cache 46. In addition, the high-precision map information 16 obtained from the server device 4 is temporarily stored in the cache 46.

Thereafter, at S3, the CPU 51 performs a static travel path generating process (FIG. 7) which will be described later. Here, the static travel path generating process is a process of generating a static travel path which is a travel path recommended for the vehicle to travel along on roads included in the planned travel route, based on the planned travel route of the vehicle, the high-precision map information 16 obtained at the above-described S2, and furthermore, obstacles present on the planned travel route. Particularly, the CPU 51 identifies, as a static travel path, a travel path recommended for the vehicle to travel along in units of lanes included in the planned travel route. Note that a static travel path is generated targeting, as will be described later, a section from a current location of the vehicle to a location a predetermined distance ahead in a traveling direction of the vehicle (e.g., an area within a secondary mesh in which the vehicle is currently located or all sections present before reaching the destination). Note that the predetermined distance can be changed as appropriate, and a static travel path is generated targeting a region including at least an area outside a range (detection range) in which road conditions around the vehicle can be detected using the exterior camera 39 and other sensors.

Then, at S4, the CPU 51 creates a speed plan for the vehicle which is used upon traveling along the static travel path generated at the above-described S3, based on the high-precision map information 16 obtained at the above-described S2. For example, travel speeds of the vehicle recommended upon traveling along the static travel path are calculated taking into account speed limit information and speed change points (e.g., intersections, curves, railroad crossings, and crosswalks) present on the planned travel route.

Then, the speed plan created at the above-described S4 is stored in the flash memory 54, etc., as assistance information used for autonomous driving assistance. In addition, an acceleration plan indicating acceleration and deceleration of the vehicle required to implement the speed plan created at the above-described S4 may also be created as assistance information used for autonomous driving assistance.

Subsequently, at S5, the CPU 51 determines, as road conditions around the vehicle, particularly, whether a factor that affects travel of the vehicle is present around the vehicle, by performing image processing on a captured image having been captured with the exterior camera 39. Here, the "factor that affects travel of the vehicle" to be determined at the above-described S5 is a dynamic factor that changes in real time, and static factors based on road structures are excluded. The factor that affects travel of the vehicle corresponds, for example, to another vehicle that travels or is parked ahead in a traveling direction of the vehicle, a congested vehicle, a pedestrian located ahead in the traveling direction of the vehicle, or a construction zone present ahead in the traveling direction of the vehicle. On the other hand, intersections, curves, railroad crossings, merge areas, lane reduction areas, etc., are excluded. In addition, even if there is another vehicle, a pedestrian, or a construction zone, if there is no possibility of them overlapping a future travel path of the vehicle (e.g., if they are located away from the future travel path of the vehicle), then they are excluded from the "factor that affects travel of the vehicle". Thus, as will be described later, for an obstacle (an obstacle managed by the obstacle information DB 14) that is determined to be an avoidance target upon generating a static travel path (S3), since a travel path that avoids the obstacle is already generated and the obstacle does not overlap a current travel path, the obstacle is excluded from the "factor that affects travel of the vehicle". In addition, for means for detecting a factor that possibly affects travel of the vehicle, a sensor such as millimeter-wave radar or a laser sensor, vehicle-to-vehicle communication, or roadside-device-to-vehicle communication may be used instead of a camera.

In addition, for example, the real-time location, etc., of each vehicle traveling on a road across the country may be managed by an external server, and the CPU 51 may obtain the location of another vehicle located around the vehicle from the external server to perform the determination process at the above-described S5.

If it is determined that a factor that affects travel of the vehicle is present around the vehicle (S5: YES), then processing transitions to S6. On the other hand, if it is determined that a factor that affects travel of the vehicle is not present around the vehicle (S5: NO), then processing transitions to S9.

At S6, the CPU 51 performs a dynamic travel path generating process (FIG. 25) which will be described later. Here, in the dynamic travel path generating process, there is generated, as a dynamic travel path, a new path for the vehicle to travel from the current location of the vehicle, and avoid or follow the "factor that affects travel of the vehicle" detected at the above-described S5, and then return to the static travel path. Note that the dynamic travel path is, as will be described later, generated targeting a section including the "factor that affects travel of the vehicle". Note also that the length of the section varies depending on what the factor is. For example, when the "factor that affects travel of the vehicle" is another vehicle (lead vehicle) traveling ahead of the vehicle, as an example, there is generated, as a dynamic travel path, a path where the vehicle makes a lane change to the right to pass the lead vehicle, and then makes a lane change to the left to return to an original lane. Note that a dynamic travel path is generated based on road conditions around the vehicle which are obtained using the exterior camera 39 and other sensors, and thus, a region for which a dynamic travel path is to be generated includes at least an area within a range (detection range) in which road conditions around the vehicle can be detected using the exterior camera 39 and other sensors.

Subsequently, at S7, the CPU 51 performs a travel path reflecting process (FIG. 28) which will be described later. Here, the travel path reflecting process is a process of reflecting the dynamic travel path which is newly generated at the above-described S6 in the static travel path generated at the above-described S3. Specifically, a cost of a portion of the static travel path included in an area from the current location of the vehicle to the end of a section including the "factor that affects travel of the vehicle" and a cost of a portion of at least one or more dynamic travel paths included in the area are calculated, and a travel path with a minimum cost is selected. Consequently, a part of the static travel path is replaced by the dynamic travel path as necessary. Note that depending on the situation, replacement by the dynamic travel path may not be performed, i.e., even if reflection of the dynamic travel path is performed, there may be no change in the static travel path generated at the above-described S3. Furthermore, when the dynamic travel path and the static travel path are identical paths, even if replacement is performed, there may be no change in the static travel path generated at the above-described S3.

Then, at S8, the CPU 51 modifies, for the static travel path in which the dynamic travel path has been reflected at the above-described S7, the speed plan for the vehicle created at the above-described S4, based on a change made by the reflected dynamic travel path. Note that when there is no change in the static travel path generated at the above-described S3 as a result of reflecting the dynamic travel path, the process at S8 may be omitted.

Subsequently, at S9, the CPU 51 computes the amounts of control for the vehicle to travel along the static travel path generated at the above-described S3 (when the dynamic travel path is reflected at the above-described S7, a path obtained after the reflection) at speeds in accordance with the speed plan created at the above-described S4 (when the speed plan is modified at the above-described S8, a plan obtained after the modification). Specifically, each of the amounts of control of an accelerator, a brake, a gear, and steering is computed. Note that the processes at S9 and S10 may be performed by the vehicle control ECU 40 that controls the vehicle, instead of the navigation device 1.

Thereafter, at S10, the CPU 51 reflects the amounts of control computed at S9. Specifically, the computed amounts of control are transmitted to the vehicle control ECU 40 through the CAN. The vehicle control ECU 40 performs vehicle control of each of the accelerator, the brake, the gear, and the steering based on the received amounts of control. As a result, it becomes possible to perform travel assistance control for traveling along the static travel path generated at the above-described S3 (when the dynamic travel path is reflected at the above-described S7, a path obtained after the reflection) at speeds in accordance with the speed plan created at the above-described S4 (when the speed plan is modified at the above-described S8, a plan obtained after the modification).

Then, at S11, the CPU 51 determines whether the vehicle has traveled a certain distance since the generation of a static travel path at the above-described S3. For example, the certain distance is 1 km.

If it is determined that the vehicle has traveled a certain distance since the generation of a static travel path at the above-described S3 (S11: YES), then processing returns to S2. Thereafter, a static travel path is generated again, targeting a section within the predetermined distance from a current location of the vehicle along the planned travel route (S2 to S4). Note that, in the first embodiment, every time the vehicle has traveled a certain distance (e.g., 1 km), a static travel path is repeatedly generated targeting a section within the predetermined distance from a current location of the vehicle along the planned travel route, but when the distance to the destination is short, a static travel path to the destination may be generated once at the time of starting traveling.

On the other hand, if it is determined that the vehicle has not traveled a certain distance since the generation of a static travel path at the above-described S3 (S11: NO), then it is determined whether to terminate the assistance travel by autonomous driving assistance (S12). A case of terminating the assistance travel by autonomous driving assistance includes a case in which the travel by autonomous driving assistance is intentionally canceled (override) by the user operating a control panel provided on the vehicle or by the user performing a steering wheel operation, a brake operation, etc., in addition to a case in which the vehicle has reached the destination.

If it is determined to terminate the assistance travel by autonomous driving assistance (S12: YES), then the autonomous driving assistance program is terminated. On the other hand, if it is determined to continue the assistance travel by autonomous driving assistance (S12: NO), then processing returns to S5.

Figure 7:
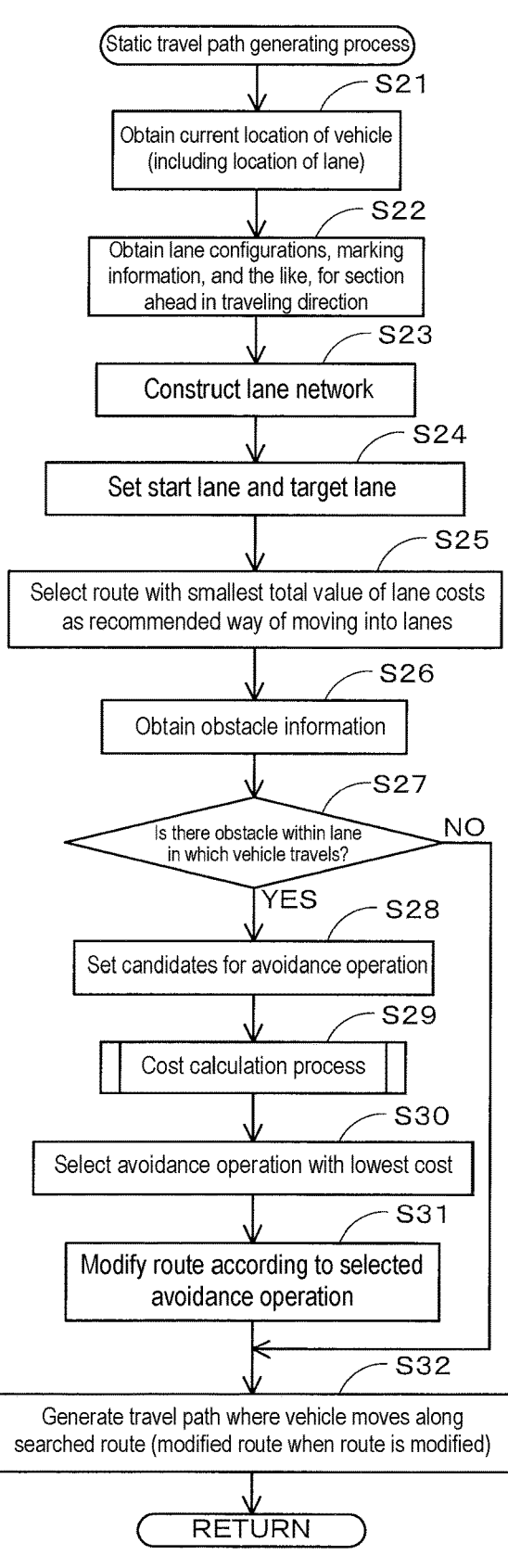
FIG. 7 is a flowchart of a subprocess program of a static travel path generating process.

Next, a subprocess of the static travel path generating process performed at the above-described S3 will be described based on FIG. 7. FIG. 7 is a flowchart of a subprocess program of the static travel path generating process.

First, at S21, the CPU 51 obtains a current location of the vehicle detected by the current location detecting part 31. Note that it is desirable to specifically identify the current location of the vehicle using, for example, high-precision GPS information or a high-precision location technique. Here, the high-precision location technique is a technique in which a white line or road surface painting information captured with a camera installed on the vehicle is detected by image recognition, and furthermore, the detected white line or road surface painting information is checked against, for example, the high-precision map information 16, by which a driving lane or a high-precision vehicle location can be detected. Furthermore, when the vehicle travels on a road having a plurality of lanes, a lane in which the vehicle travels is also identified.

Then, at S22, the CPU 51 obtains, based on the high-precision map information 16 obtained at the above-described S2, lane configurations, marking information, information about intersections, etc., targeting a section ahead in a traveling direction of the vehicle for which a static travel path is generated (e.g., an area within a secondary mesh including the current location of the vehicle). Note that the lane configurations and marking information obtained at the above-described S22 include information that identifies the number of lanes, lane widths, how and where the number of lanes increases or decreases when there is an increase or decrease in the number of lanes, a passage segment in a traveling direction for each lane, and a connection between roads for each lane (specifically, a correspondence between a lane included in a road before passing through an intersection and a lane included in a road after passing through the intersection), etc. In addition, the information about intersections includes information about the locations and configurations of ground objects placed at the intersections, in addition to the configurations of the intersections. Furthermore, the "ground objects placed at the intersections" include road surface markings painted on road surfaces, such as guidelines (white guidelines) and rhombic guide zones (diamond-shaped markings) placed at the center of the intersections, and structures such as poles.

Subsequently, at S23, the CPU 51 constructs a lane network, targeting the section ahead in the traveling direction of the vehicle for which a static travel path is generated, based on the lane configurations and marking information obtained at the above-described S22. Here, the lane network is a network representing movement into lanes that can be selected by the vehicle.

Figure 8:
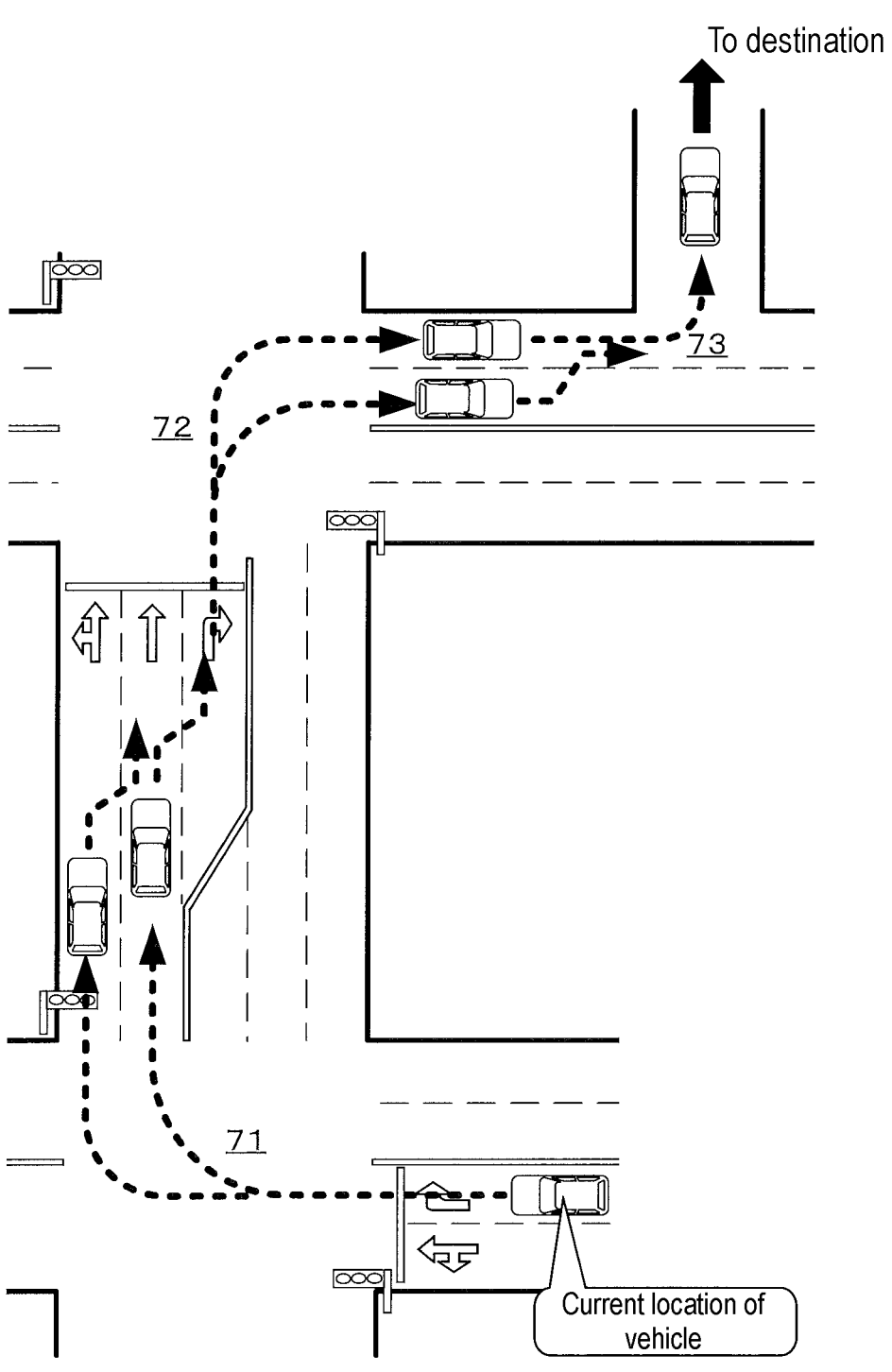
FIG. 8 is a diagram showing an example of a planned travel route of a vehicle.

Here, as an example of constructing a lane network at the above-described S23, for example, a case in which the vehicle travels on a planned travel route shown in FIG. 8 will be described as an example. The planned travel route shown in FIG. 8 is a route on which the vehicle travels straight ahead from its current location, and then turns right at a next intersection 71 and further turns right at a next intersection 72, too, and turns left at a next intersection 73. In the planned travel route shown in FIG. 8, for example, when the vehicle turns right at the intersection 71, the vehicle can enter a right lane or can also enter a left lane. Note, however, that since the vehicle needs to turn right at the next intersection 72, the vehicle needs to move into a far right lane at the time of entering the intersection 72. In addition, when the vehicle turns right at the intersection 72, too, the vehicle can enter a right lane or can also enter a left lane. Note, however, that since the vehicle needs to turn left at the next intersection 73, the vehicle needs to move into a far left lane at the time of entering the intersection 73. A lane network constructed targeting a section that allows such movement into lanes is shown in FIG. 9.

Figure 9:
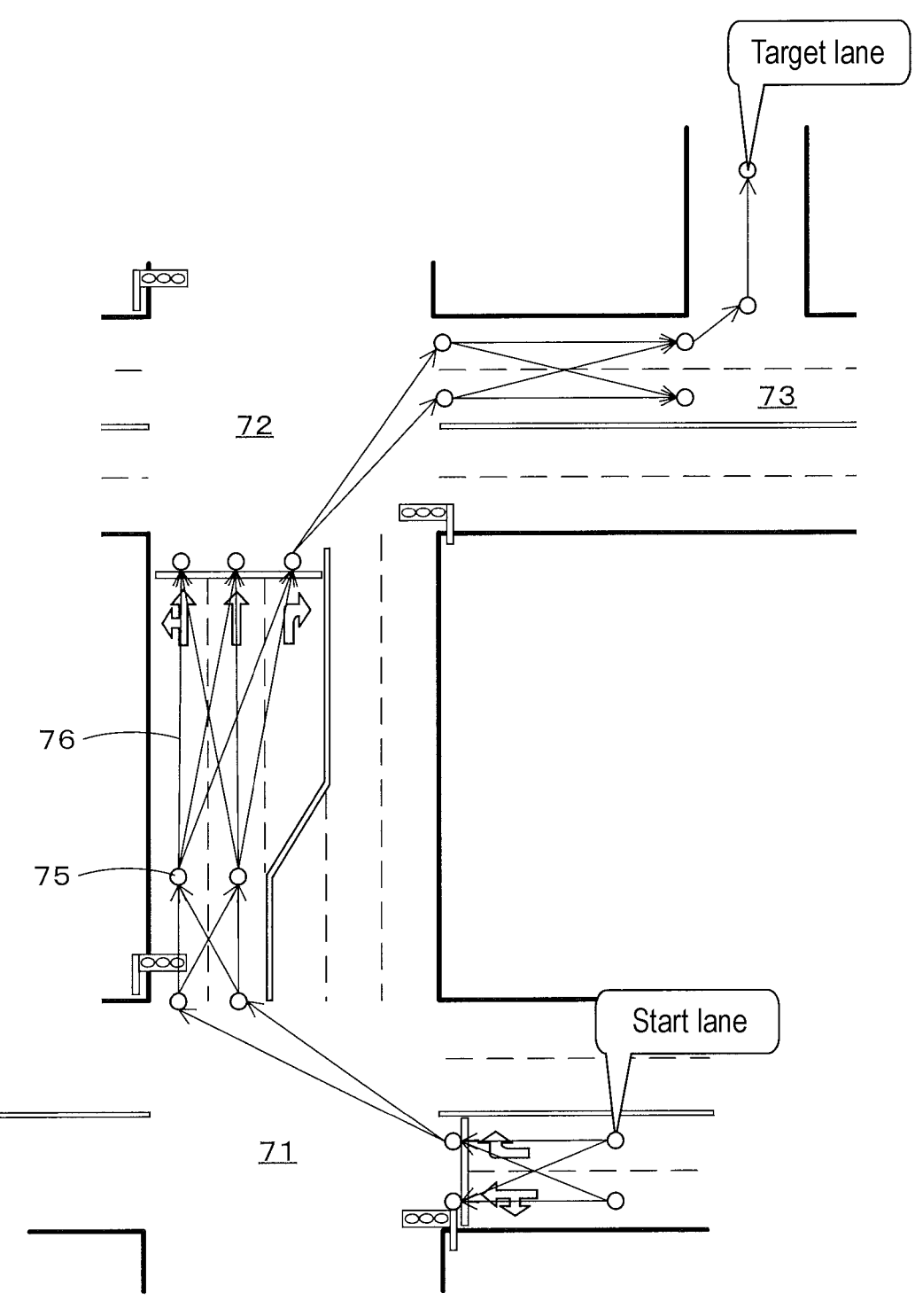
FIG. 9 is a diagram showing an example of a lane network constructed for the planned travel route shown in FIG. 8.

As shown in FIG. 9, in the lane network, a section ahead in a traveling direction of the vehicle for which a static travel path is generated is divided into a plurality of blocks (groups). Specifically, the section is divided, with a location where the vehicle enters an intersection, a location where the vehicle exits the intersection, and a location where the number of lanes increases or decreases being boundaries. A node point (hereinafter, referred to as lane node) 75 is set at a point in each lane located at a boundary of each divided block. Furthermore, a link (hereinafter, referred to as lane link) 76 that connects lane nodes 75 is set.

In addition, the above-described lane network includes, particularly, information that identifies, by a connection of lane nodes with a lane link at an intersection, a correspondence between a lane included in a road before passing through the intersection and a lane included in a road after passing through the intersection, i.e., a lane into which the vehicle can move after passing through the intersection from a lane used before passing through the intersection. Specifically, the lane network indicates that the vehicle can move between lanes corresponding to lane nodes that are connected by a lane link among lane nodes set on a road used before passing through an intersection and lane nodes set on a road used after passing through the intersection. To generate such a lane network, the high-precision map information 16 stores, for each road connected to an intersection, lane flags indicating a correspondence between lanes and set for each combination of a road that enters the intersection and a road that exits the intersection. When the CPU 51 constructs a lane network at the above-described S23, the CPU 51 forms a connection of lane nodes with a lane link at an intersection by referring to the lane flags.

Then, at S24, for the lane network constructed at the above-described S23, the CPU 51 sets a start lane (departure node), in which the vehicle starts moving, at a lane node located at a starting point of the lane network, and sets a target lane (target node), which is a target to which the vehicle moves, at a lane node located at an end point of the lane network. Note that when the starting point of the lane network is a road with a plurality of lanes in each direction, a lane node corresponding to a lane in which the vehicle is currently located serves as a start lane. On the other hand, when the end point of the lane network is a road with a plurality of lanes in each direction, a lane node corresponding to a far left lane (in a case of left-hand traffic) serves as a target lane.

Thereafter, at S25, the CPU 51 derives a route with the lowest lane costs (hereinafter, referred to as recommended route) among routes each continuously connecting the start lane to the target lane, by referring to the lane network constructed at the above-described S23. For example, a route is searched from a target-lane side using Dijkstra's algorithm. Note, however, that search means other than Dijkstra's algorithm may be used provided that a route that continuously connects the start lane to the target lane can be searched. The derived recommended route is a way of moving into lanes by the vehicle that is recommended when the vehicle moves.

In addition, lane costs used to search for the above-described route are provided for each lane link 76. The lane cost provided to each lane link 76 has, as a reference value, the length of the lane link 76 or the time required to move on the lane link 76. Particularly, in the present embodiment, the length of the lane link (in units of meters) is used as the reference value of the lane cost. In addition, for a lane link involving a lane change, a lane change cost (e.g., 50) is added to the above-described reference value. Note that the value of the lane change cost may vary depending on the number of lane changes or a location where a lane change is made. For example, when a lane change is made at a location near an intersection or when a lane change over two lanes is made, a lane change cost to be added can be set to a higher value.

Subsequently, at S26, the CPU 51 obtains, from the server device 4, obstacle information about obstacles present on a planned travel route on which the vehicle travels, targeting the planned travel route. Note that the obstacles are, particularly, obstacles which become factors that hinder travel of the vehicle, and correspond, for example, to parked vehicles parked on roads, signs and fences placed on construction sites on roads, and bumps and dips in road surfaces. In addition, the obstacle information includes, specifically, information that identifies the date and time on which an obstacle is detected; the type of the obstacle; and information that identifies the location of the obstacle. Particularly, for the location of the obstacle, there are identified a link ID of a link where the obstacle is located, the distance from a starting point of the link, a lane in which the obstacle is located, and an area in which the obstacle is located within the lane. The above-described obstacle information is managed in advance by the server device 4, based on probe information collected from each vehicle traveling across the country, and is stored in the obstacle information DB 14 included in the server device 4 (FIG. 3). Thus, at the above-described S26, information on obstacles present in an area outside a range (detection range) in which road conditions around the vehicle can be detected using the exterior camera 39 and other sensors of the vehicle can also be obtained.

Then, at S27, the CPU 51 determines whether there is an obstacle within a lane in which the vehicle travels in a case of traveling on the planned travel route using the recommended route selected at the above-described S25, based on the high-precision map information 16 obtained at the above-described S2 and the obstacle information obtained at the above-described S26.

If it is determined that there is an obstacle within a lane in which the vehicle travels in a case of traveling on the planned travel route using the recommended route selected at the above-described S25 (S27: YES), then processing transitions to S28. On the other hand, if it is determined that there is no obstacle within a lane in which the vehicle travels (S27: NO), then the current recommended route is maintained and processing transitions to S32.

At S28, the CPU 51 sets candidates for avoidance operation for avoiding the obstacle determined to be present within the lane in which the vehicle travels. For example, the candidates for avoidance operation include the following operation (1) to (3).

Figure 10:
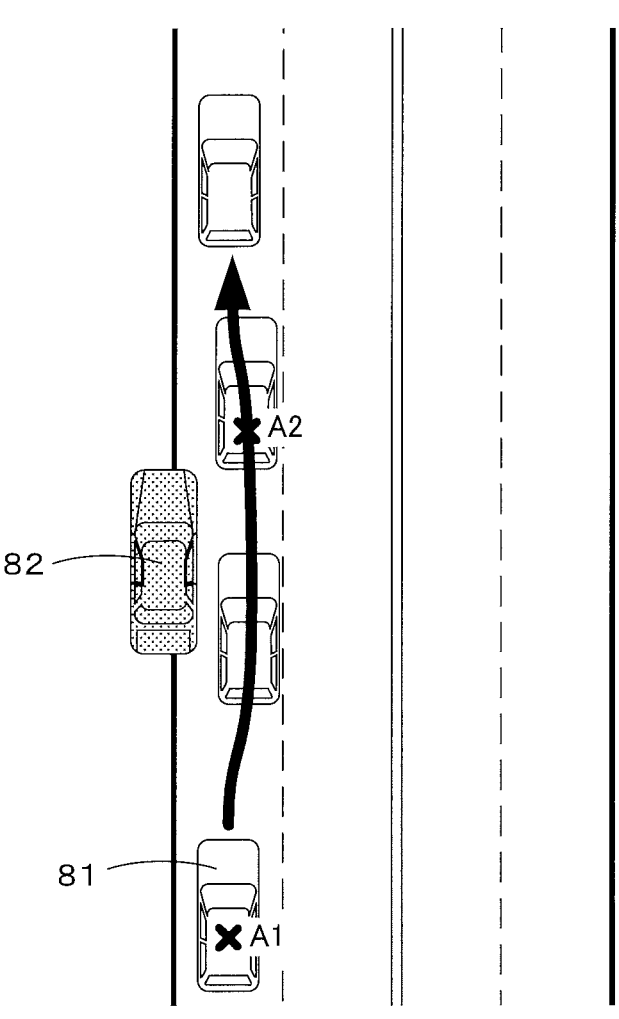
FIG. 10 is a diagram showing an example of avoidance operation for avoiding an obstacle by a vehicle moving within a lane.
Figure 11:
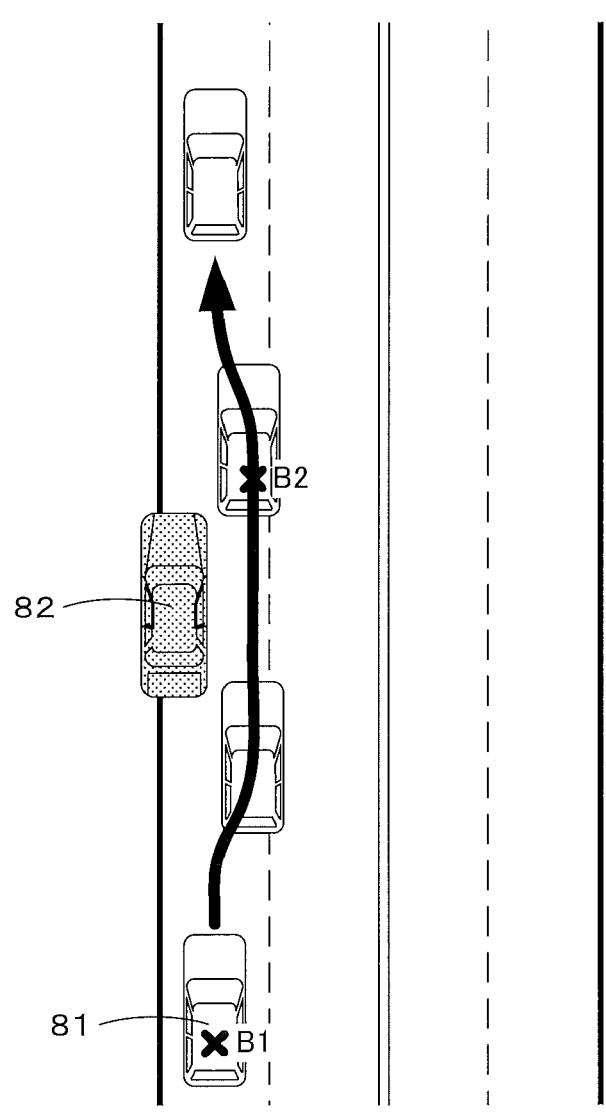
FIG. 11 is a diagram showing an example of avoidance operation for avoiding the obstacle by the vehicle moving out of the lane such that a part of its vehicle body drifts out of the lane.
Figure 12:
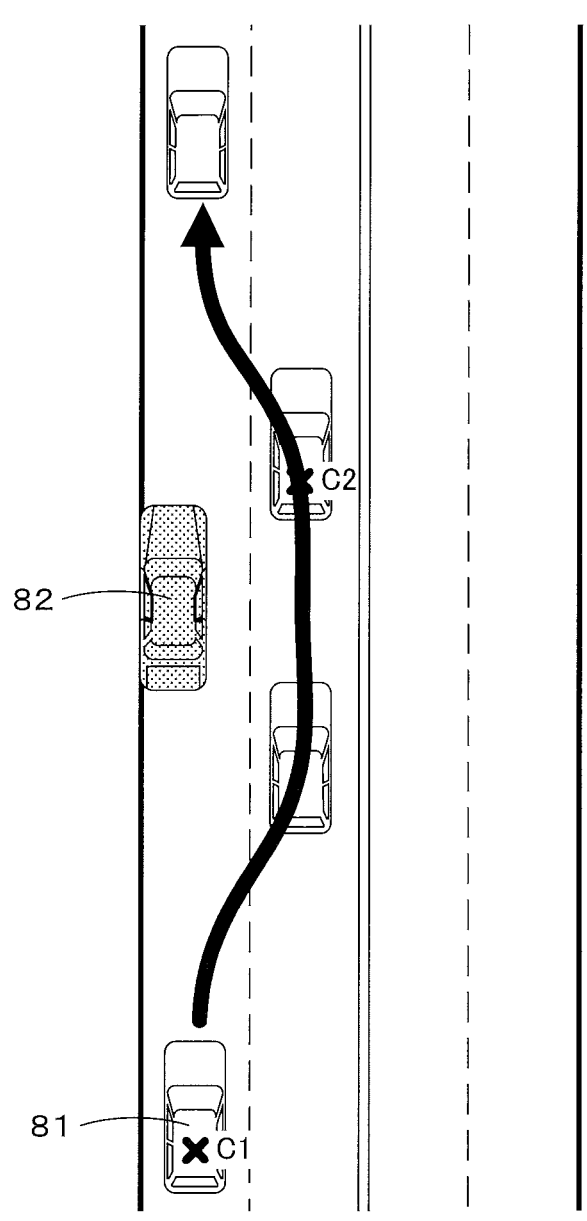
FIG. 12 is a diagram showing an example of avoidance operation for avoiding the obstacle by the vehicle changing its traveling lane to an adjacent lane.

(1) Avoidance operation for avoiding, as shown in FIG. 10, an obstacle (in FIG. 10, a parked vehicle parked on the roadside) 82 by a vehicle 81 traveling in a lane in which the obstacle 82 is located, and moving within the lane (2) Avoidance operation for avoiding, as shown in FIG. 11, the obstacle (in FIG. 11, a parked vehicle parked on the roadside) 82 by the vehicle 81 moving out of the lane in which the obstacle 82 is located such that a part of its vehicle body drifts out of the lane (3) Avoidance operation for avoiding, as shown in FIG. 12, the obstacle (in FIG. 12, a parked vehicle parked on the roadside) 82 by the vehicle 81 changing its traveling lane from the lane in which the obstacle 82 is located to an adjacent lane Note, however, that all of the above-described (1) to (3) are not always candidates for avoidance operation, and the candidates vary depending on the location of the obstacle, the type of road, a road configuration, the manner of placement of markings, etc. For example, when a road has only one lane, since the avoidance operation (3) cannot be performed, (1) and (2) are candidates for avoidance operation. In addition, when an obstacle occupies a large region in a lane and the vehicle cannot avoid the obstacle by moving within the lane (a region in the lane through which the vehicle can pass is smaller than vehicle width), since the avoidance operation (1) cannot be performed, (2) and (3) are candidates for avoidance operation.

Then, at S29, the CPU 51 performs a cost calculation process (FIG. 13) which will be described later. The cost calculation process is a process of calculating a cost indicating a burden on a passenger of the vehicle, for each candidate for avoidance operation set at the above-described S28.

Subsequently, at S30, the CPU 51 compares the costs calculated at the above-described S29, to select avoidance operation recommended to avoid the obstacle (hereinafter, referred to as recommended avoidance operation) from among the plurality of candidates for avoidance operation set at the above-described S28. Basically, a candidate for avoidance operation with the lowest calculated cost is selected as the recommended avoidance operation.

Thereafter, at S31, the CPU 51 modifies the recommended route selected at the above-described S25, based on the recommended avoidance operation selected at the above-described S30. Specifically, when the avoidance operation (1) is selected as the recommended avoidance operation, as shown in FIG. 10, each of a point A1 at which the vehicle starts moving to the right (i.e., starts the avoidance operation) and a point A2 at which the vehicle thereafter passes through the obstacle 82 and starts moving to the left is added to the recommended route. Note that the locations of the points A1 and A2 can be set as appropriate, as far as the obstacle can be avoided, and for example, the point A1 is a point at the longest distance L from the location of the obstacle 82 toward a vehicle 81 side, and the point A2 is a point immediately after passing through the obstacle, the longest distance L being identified in the cost calculation process at S29. In addition, when the avoidance operation (2) is selected as the recommended avoidance operation, as shown in FIG. 11, each of a point B1 at which the vehicle starts moving to the right (i.e., starts the avoidance operation) and a point B2 at which the vehicle thereafter passes through the obstacle 82 and starts moving to the left is added to the recommended route. Note that the locations of the points B1 and B2 can be set as appropriate, as far as the obstacle can be avoided, and for example, the point B1 is a point at the longest distance L from the location of the obstacle 82 toward the vehicle 81 side, and the point B2 is a point immediately after passing through the obstacle, the longest distance L being identified in the cost calculation process at S29. In addition, when the avoidance operation (3) is selected as the recommended avoidance operation, as shown in FIG. 12, each of a point C1 at which the vehicle starts making a lane change to the right (i.e., starts the avoidance operation) and a point C2 at which the vehicle thereafter passes through the obstacle 82 and starts making a lane change to the left is added to the recommended route. Note that the locations of the points C1 and C2 can be set as appropriate, as far as the obstacle can be avoided, and for example, the point C1 is a point at the longest distance L from the location of the obstacle 82 toward the vehicle 81 side, and the point C2 is a point immediately after passing through the obstacle, the longest distance L being identified in the cost calculation process at S29.

Thereafter, at S32, the CPU 51 generates a specific travel path for traveling along the recommended route derived at the above-described S25 (when a modification is made at S31, a recommended route obtained after the modification). Note that for a travel path of a section involving lane changes, the locations of the lane changes are set such that the lane changes are not continuously made as much as possible and are made at locations away from an intersection. In addition, particularly, in a case of generating a travel path for making a left or right turn at an intersection, making a lane change, or performing the above-described avoidance operation (1) to (3) for avoiding an obstacle, lateral acceleration (lateral G) occurring in the vehicle is calculated, and paths that are connected as smoothly as possible are calculated using clothoid curves on conditions that the lateral G does not interfere with autonomous driving assistance and does not exceed an upper limit value (e.g., 0.2 G) at which a passenger of the vehicle is not given discomfort. Note that travel paths used upon performing the above-described avoidance operation (1) to (3) are calculated in the cost calculation process at S29, too, and thus, details will be described later. By performing the above-described process, a static travel path is generated which is a travel path recommended for the vehicle to travel along on roads included in the planned travel route. Note that for a block that is not a block in which a lane change is made or a block in which avoidance movement is performed or a block present within an intersection, a path that passes through the center of a lane is a travel path recommended for the vehicle to travel along.

The static travel path generated at the above-described S32 is stored in the flash memory 54, etc., as assistance information used for autonomous driving assistance.

Figure 13:
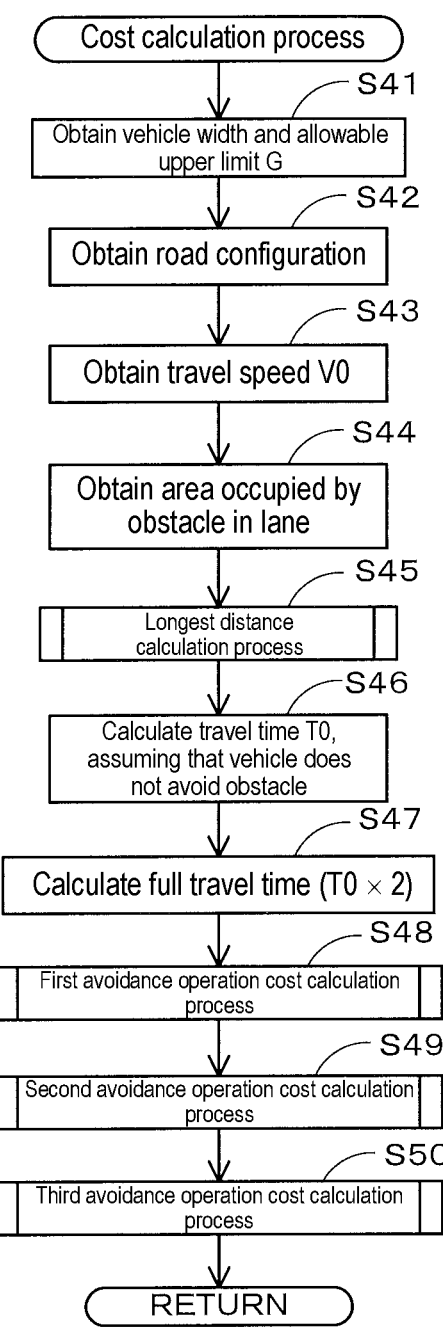
FIG. 13 is a flowchart of a subprocess program of a cost calculation process.

Next, a subprocess of the cost calculation process performed at the above-described S29 will be described based on FIG. 13. FIG. 13 is a flowchart of a subprocess program of the cost calculation process.

First, at S41, the CPU 51 obtains the vehicle width of the vehicle having the navigation device 1 mounted thereon. In addition, an allowable upper limit value of lateral acceleration (lateral G) occurring in the vehicle when avoiding an obstacle is also obtained. Note that the allowable upper limit value of acceleration (lateral G) may be a fixed value or may be a variable value. For example, the allowable upper limit value is 0.2 G.

Then, at S42, the CPU 51 obtains a road configuration of a road determined to have an obstacle at the above-described S27, based on the high-precision map information 16 obtained at the above-described S2. Specifically, the number of lanes and lane widths are obtained.

Subsequently, at S43, the CPU 51 obtains a travel speed $V_0$ of the vehicle at which the vehicle travels on the road determined to have an obstacle at the above-described S27. For example, the travel speed $V_0$ may be a speed limit for the road, or may be determined based on the type of road, or may be an average vehicle speed for the corresponding road calculated based on probe information, or may be estimated from a travel history of the vehicle. In addition, it is desirable to obtain the travel speed $V_0$, taking into also account the current road conditions such as traffic congestion.

Figure 14:
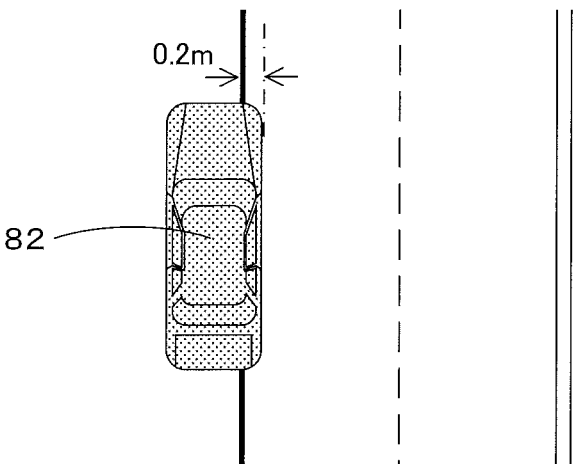
FIG. 14 is a diagram showing an example of an obstacle.

Thereafter, at S44, the CPU 51 obtains a more specific location of the obstacle, which is determined at the above-described S27 to be present within the lane in which the vehicle travels, based on the obstacle information stored in the obstacle information DB 14. Specifically, information is obtained that indicates from which edge and how much area of the lane in which the vehicle travels is occupied by the obstacle. For example, as shown in FIG. 14, when a parked vehicle parked on the roadside is present as an obstacle 82, information indicating that the obstacle 82 is located in an area extending 0.2 m from a left edge of a lane is obtained.

Thereafter, at S45, the CPU 51 performs a longest distance calculation process (FIG. 15) which will be described later. Here, the longest distance calculation process is a process of calculating the longest distance (hereinafter, referred to as longest distance L) among distances required to avoid the obstacle, which is determined at the above-described S27 to be present within the lane in which the vehicle travels, by performing the above-described avoidance operation (1) to (3) when it is assumed that the obstacle is avoided by performing the above-described avoidance operation (1) to (3). Note that the "distances required to avoid the obstacle" each are not a distance required for the vehicle to avoid the obstacle and return to an original travel state, but a distance required for the vehicle just to avoid the obstacle. For example, in the avoidance operation (1) shown in FIG. 10, the distance is a distance required for the vehicle to move to a right edge of the lane where there is no possibility of collision with the obstacle 82. In addition, in the avoidance operation (2) shown in FIG. 11, the distance is a distance required for the vehicle to move outside the lane where there is no possibility of collision with the obstacle 82, such that a part of its vehicle body drifts out of the lane. In addition, in the avoidance operation (3) shown in FIG. 12, the distance is a distance required for the vehicle to complete a lane change to a right lane.

Then, at S46, the CPU 51 calculates travel time $T_0$ required to travel the longest distance L when it is assumed that the vehicle travels not avoiding the obstacle. Specifically, the travel time $T_0$ is calculated by the following equation (1):

$$T_0 = L/V_0 \qquad (1)$$

Subsequently, at S47, the CPU 51 calculates, as full travel time, time obtained by doubling the travel time $T_0$ calculated at the above-described S46. Note that as will be described later, the full travel time is used as reference time upon calculating a cost based on travel time for the above-described avoidance operation (1) to (3).

Then, at S48, the CPU 51 performs a first avoidance operation cost calculation process (FIG. 20) which will be described later. The first avoidance operation cost calculation process is a process of calculating a cost indicating a burden on a passenger of the vehicle, particularly, for the above-described avoidance operation (1) among the candidates for avoidance operation set at the above-described S28. Note, however, that when the candidates for avoidance operation set at the above-described S28 do not include the above-described avoidance operation (1), the process at S48 is not performed.

Subsequently, at S49, the CPU 51 performs a second avoidance operation cost calculation process (FIG. 21) which will be described later. The second avoidance operation cost calculation process is a process of calculating a cost indicating a burden on a passenger of the vehicle, particularly, for the above-described avoidance operation (2) among the candidates for avoidance operation set at the above-described S28. Note, however, that when the candidates for avoidance operation set at the above-described S28 do not include the above-described avoidance operation (2), the process at S49 is not performed.

Subsequently, at S50, the CPU 51 performs a third avoidance operation cost calculation process (FIG. 22) which will be described later. The third avoidance operation cost calculation process is a process of calculating a cost indicating a burden on a passenger of the vehicle, particularly, for the above-described avoidance operation (3) among the candidates for avoidance operation set at the above-described S28. Note, however, that when the candidates for avoidance operation set at the above-described S28 do not include the above-described avoidance operation (3), the process at S50 is not performed.

Thereafter, processing transitions to S30, and the CPU 51 compares the costs calculated at the above-described S48 to S50, to select, as recommended avoidance operation, a candidate for avoidance operation with the lowest calculated cost from among the plurality of candidates for avoidance operation set at the above-described S28.

Figure 15:
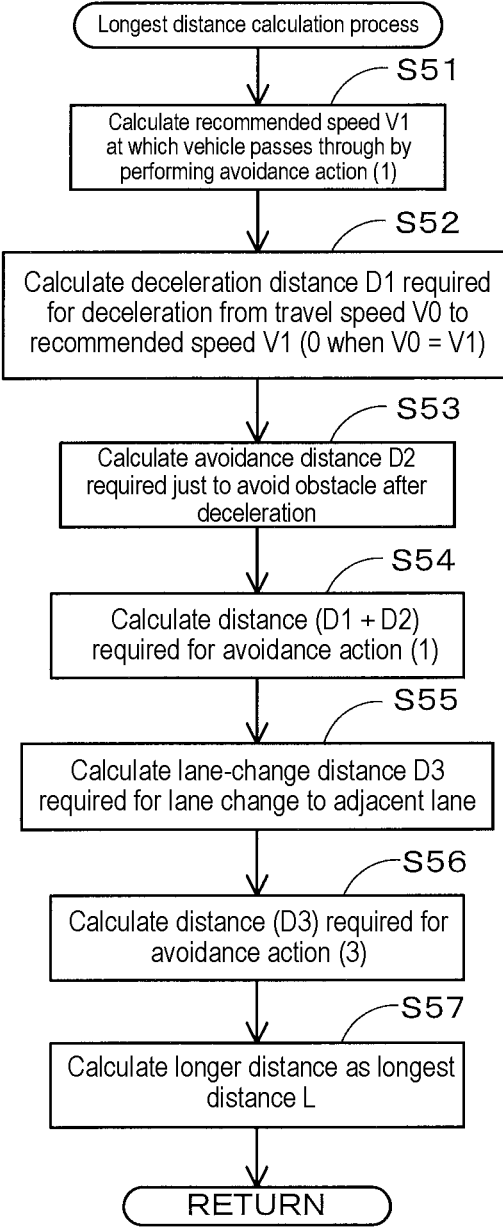
FIG. 15 is a flowchart of a subprocess program of a longest distance calculation process.

Next, a subprocess of the longest distance calculation process performed at the above-described S45 will be described based on FIG. 15. FIG. 15 is a flowchart of a subprocess program of the longest distance calculation process.

First, at S51, the CPU 51 calculates a recommended speed $V_1$ at which the vehicle avoids the obstacle, which is determined at the above-described S27 to be present within the lane in which the vehicle travels, when it is assumed that the obstacle is avoided by performing the above-described avoidance operation (1).

Figure 16:
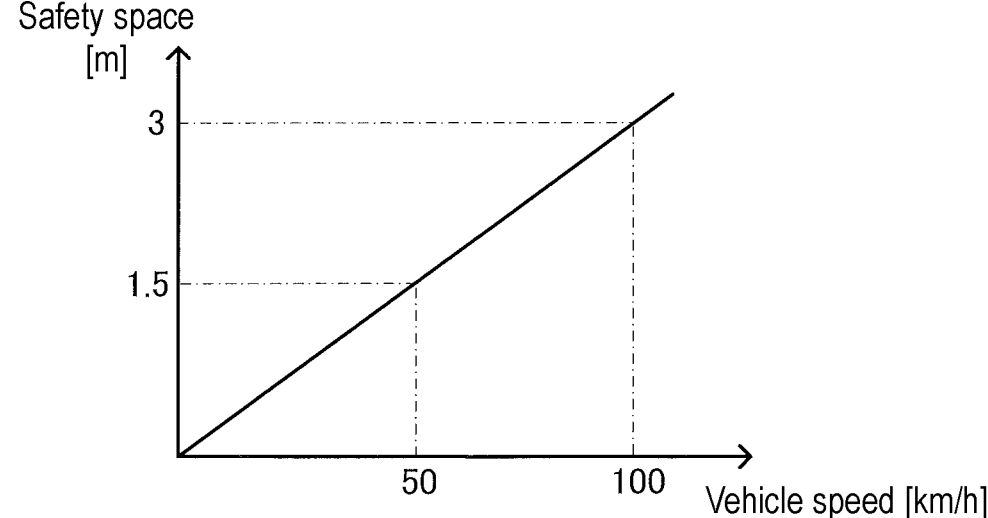
FIG. 16 is a diagram describing safety space.

Note that the recommended speed $V_1$ is calculated taking into account safety space and space that can be secured between the vehicle and the obstacle when the vehicle passes through the obstacle. Here, FIG. 16 is a diagram showing safety space. The safety space is a distance recommended to be left between the vehicle and the obstacle when the vehicle passes by the obstacle at a certain speed. For example, when the vehicle travels at 50 km/h, it is recommended to leave 1.5 m of space between the vehicle and the obstacle. In addition, when the vehicle travels at 100 km/h, it is recommended to leave 3 m of space between the vehicle and the obstacle. Specifically, the safety space is identified by a relationship shown in the following equation (2):

$$\text{Safety space [m]} = 0.03 \times \text{vehicle speed [km/h]} \quad (2)$$

Figure 17:
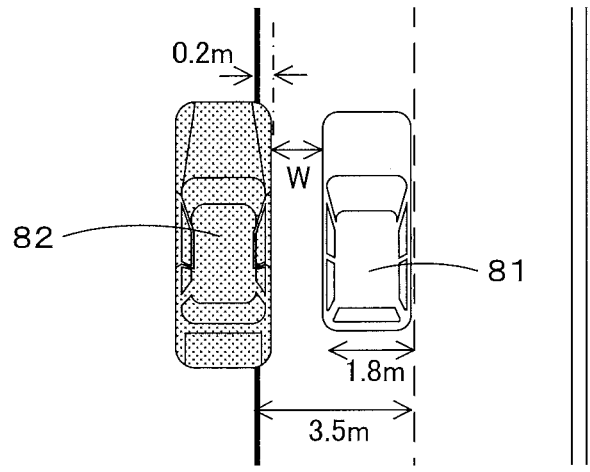
FIG. 17 is a diagram describing a method of calculating space that can be secured between a vehicle and an obstacle when avoidance operation for avoiding the obstacle by the vehicle moving within a lane is performed.

The CPU 51 first calculates maximum space W that can be secured between the vehicle and the obstacle when the vehicle avoids the obstacle by moving within the lane, by referring to the vehicle width of the vehicle obtained at the above-described S41, the lane widths obtained at the above-described S42, and the area occupied by the obstacle in the lane which is obtained at the above-described S44. For example, as shown in FIG. 17, when a parked vehicle parked on the roadside is present as an obstacle 82, the obstacle 82 is located in an area extending 0.2 m from a left edge of a lane, and the lane width is 3.5 m and the vehicle width of a vehicle 81 is 1.8 m, the space W is 1.5 m. Then, safety space recommended when the vehicle travels at the travel speed $V_0$ obtained at the above-described S43 is identified from FIG. 16, and when the space W is larger than the safety space, it is determined that the safety space can be secured even if the vehicle travels at the travel speed $V_0$, and thus, the travel speed $V_0$ is calculated as the recommended speed $V_1$. On the other hand, when the safety space recommended when the vehicle travels at the travel speed $V_0$ is larger than the space W, it is determined that the safety space cannot be secured if the vehicle travels at the travel speed $V_0$, and thus, a corresponding vehicle speed for the space W being safety space is identified from FIG. 16 and calculated as the recommended speed $V_1$.

Then, at S52, the CPU 51 calculates a distance required for deceleration from the travel speed $V_0$ obtained at the above-described S43 to the recommended speed $V_1$ (hereinafter, referred to as deceleration distance D1). Note that the deceleration distance D1 is calculated, with an upper limit for forward and backward acceleration allowed for the vehicle upon deceleration being 0.2 G. In addition, when the travel speed $V_0$ is identical to the recommended speed $V_1$, the deceleration distance D1 is 0.

Figure 18:
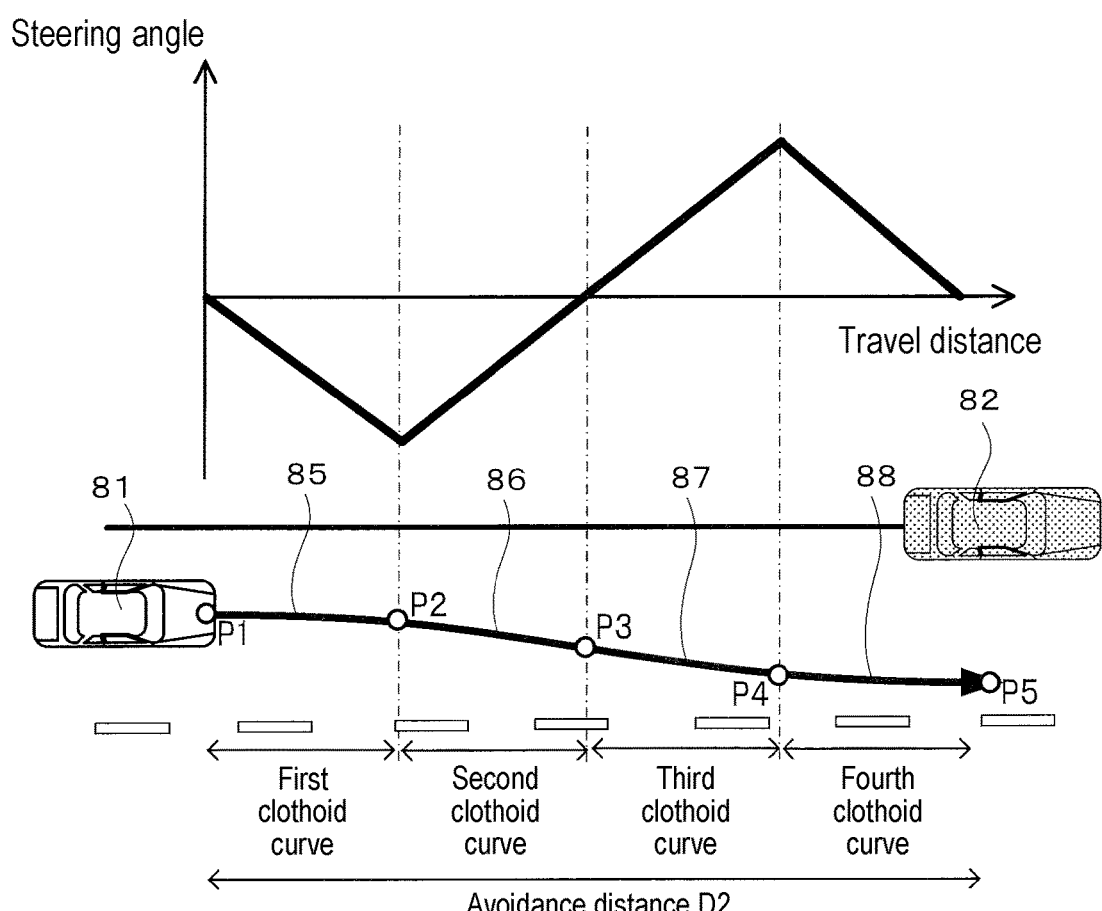
FIG. 18 is a diagram showing a travel path of a vehicle recommended when avoidance operation for avoiding an obstacle by the vehicle moving within a lane is performed.

Subsequently, at S53, the CPU 51 calculates a distance required just to avoid the obstacle by performing the avoidance operation (1) after decelerating to the recommended speed $V_1$ (hereinafter, referred to as avoidance distance D2). Here, to calculate the avoidance distance D2, first, a travel path of the vehicle recommended when the vehicle avoids the obstacle by moving within the lane is calculated. Here, the travel path of the vehicle recommended when the vehicle avoids the obstacle by moving within the lane includes clothoid curves whose curvatures change continuously. More specifically, the path is obtained by connecting a plurality of clothoid curves with different shapes. FIG. 18 is a diagram showing, for example, a travel path of a vehicle recommended when the vehicle moves to the right in a lane. As shown in FIG. 18, the travel path of a vehicle recommended when the vehicle moves to the right in a lane includes a first clothoid curve 85 where the vehicle travels from a movement start point P1 to a first relay point P2 while gradually turning the steering rightward (i.e., while gradually largely changing the curvature); a second clothoid curve 86 where the vehicle travels from the first relay point P2 to an intermediate point P3 while gradually bringing the steering back to a straight-ahead direction (i.e., while gradually mildly changing the curvature); a third clothoid curve 87 where the vehicle travels from the intermediate point P3 to a second relay point P4 while gradually turning the steering leftward this time (i.e., while gradually largely changing the curvature); and a fourth clothoid curve 88 where the vehicle thereafter travels from the second relay point P4 to a movement end point P5 while gradually bringing the steering back to the straight-ahead direction (i.e., while gradually mildly changing the curvature). Note that the lateral moving width of the clothoid curves 85 to 88 is a distance at which safety space can be secured with an obstacle 82 at the time point "P5". Then, the CPU 51 calculates each of the clothoid curves 85 to 88 so as to obtain, using the clothoid curves, a path in which acceleration (lateral G) occurring upon making a lane change does not exceed an upper limit value (e.g., 0.2 G) at which a passenger of the vehicle is not given discomfort, and which is further as smooth as possible and has the shortest possible distance required for a lane change. Then, by connecting the calculated clothoid curves 85 to 88, a travel path of the vehicle is calculated that is recommended when the vehicle avoids the obstacle by moving within the lane. Furthermore, an avoidance distance D2 is also calculated from the entire length of the calculated travel path.

Thereafter, at S54, the CPU 51 calculates a total of the deceleration distance D1 calculated at the above-described S52 and the avoidance distance D2 calculated at the above-described S53, as a distance required to avoid the obstacle by performing the avoidance operation (1) when it is assumed that the obstacle is avoided by performing the avoidance operation (1).

Figure 19:
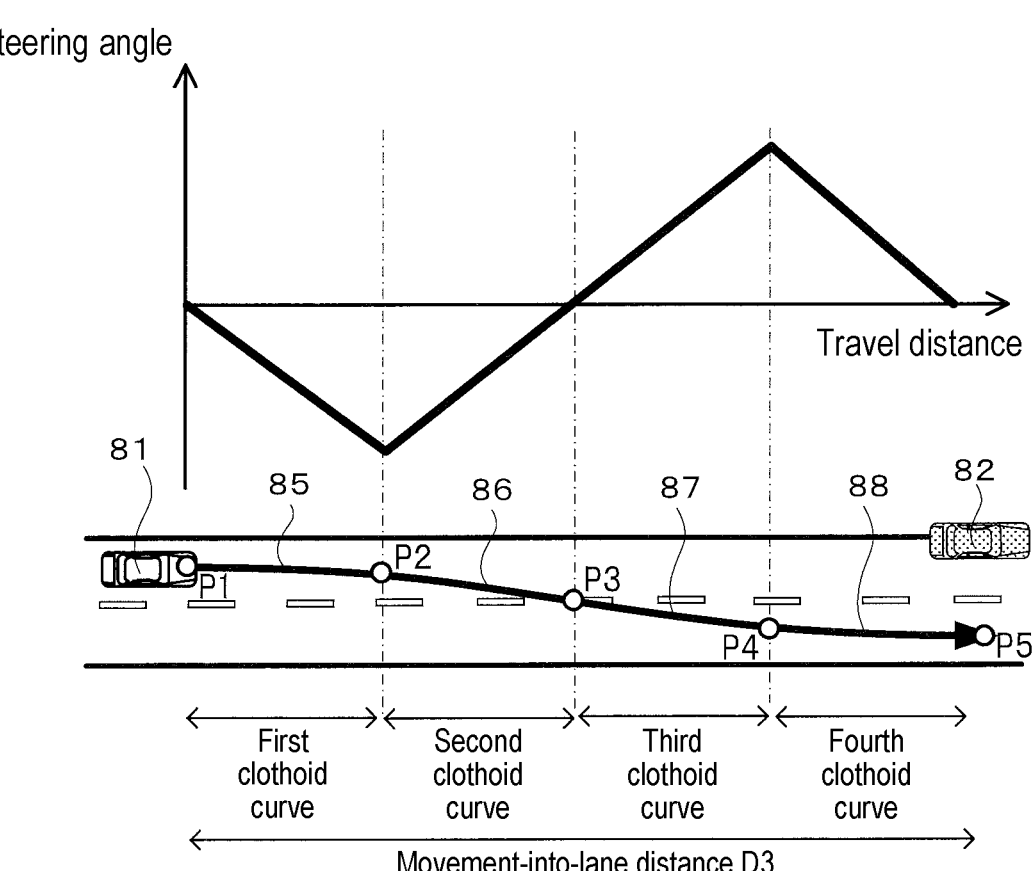
FIG. 19 is a diagram showing a travel path of a vehicle recommended when avoidance operation for avoiding an obstacle by the vehicle changing its lane to an adjacent lane is performed.

Then, at S55, the CPU 51 calculates a distance required to make a lane change to an adjacent lane (hereinafter, referred to as lane-change distance D3) at the travel speed $V_0$ obtained at the above-described S43. Here, to calculate the lane-change distance D3, first, a travel path of the vehicle recommended when the vehicle makes a lane change at the travel speed $V_0$ is calculated. Here, the travel path of the vehicle recommended when the vehicle makes a lane change includes clothoid curves whose curvatures change continuously. More specifically, the path is obtained by connecting a plurality of clothoid curves with different shapes. FIG. 19 is a diagram showing, for example, a travel path of a vehicle recommended when the vehicle moves to an adjacent lane on the right. As shown in FIG. 19, the travel path of a vehicle recommended when the vehicle moves to an adjacent lane on the right includes a first clothoid curve 85 where the vehicle travels from a movement-into-lane start point P1 to a first relay point P2 while gradually turning the steering rightward (i.e., while gradually largely changing the curvature); a second clothoid curve 86 where the vehicle travels from the first relay point P2 to a lane boundary P3 while gradually bringing the steering back to a straight-ahead direction (i.e., while gradually mildly changing the curvature); a third clothoid curve 87 where the vehicle travels from the lane boundary P3 to a second relay point P4 while gradually turning the steering leftward this time (i.e., while gradually largely changing the curvature); and a fourth clothoid curve 88 where the vehicle thereafter travels from the second relay point P4 to a movement-into-lane end point P5 while gradually bringing the steering back to the straight-ahead direction (i.e., while gradually mildly changing the curvature). Note that the lateral moving width of the clothoid curves 85 to 88 is a distance between adjacent lanes (e.g., 3.5 m). Then, the CPU 51 calculates each of the clothoid curves 85 to 88 so as to obtain, using the clothoid curves, a path in which acceleration (lateral G) occurring upon making a lane change does not exceed an upper limit value (e.g., 0.2 G) at which a passenger of the vehicle is not given discomfort, and which is further as smooth as possible and has the shortest possible distance required for a lane change. Then, by connecting the calculated clothoid curves 85 to 88, a travel path of the vehicle is calculated that is recommended when the vehicle makes a lane change at the travel speed $V_0$. Furthermore, a lane-change distance D3 is also calculated from the entire length of the calculated travel path.

Thereafter, at S56, the CPU 51 calculates the lane-change distance D3 calculated at the above-described S55 as a distance required to avoid the obstacle by performing the avoidance operation (3) when it is assumed that the obstacle is avoided by performing the avoidance operation (3).

Subsequently, at S57, the CPU 51 calculates, as the longest distance L, a longer one of the distance required to avoid the obstacle by performing the avoidance operation (1) which is calculated at the above-described S54 and the distance required to avoid the obstacle by performing the avoidance operation (3) which is calculated at the above-described S56.

Note that basically, the distance required to avoid the obstacle by performing the avoidance operation (2) is not longer than the distance required to avoid the obstacle by performing the avoidance operation (3), and thus, in the present embodiment, in the longest distance calculation process shown in FIG. 15, the distance required to avoid the obstacle by performing the avoidance operation (2) is not calculated. However, the distance required to avoid the obstacle by performing the avoidance operation (2) may be calculated. In addition, for a case in which the candidates for avoidance operation set at the above-described S28 do not include the above-described avoidance operation (3), a comparison may be made between the distance required to avoid the obstacle by performing the avoidance operation (1) and the distance required to avoid the obstacle by performing the avoidance operation (2), and a longer one may be calculated as the longest distance L. In addition, for a case in which the candidates for avoidance operation set at the above-described S28 do not include the above-described avoidance operation (1), only the distance required to avoid the obstacle by performing the avoidance operation (3) may be calculated and determined to be the longest distance L.

Figure 20:
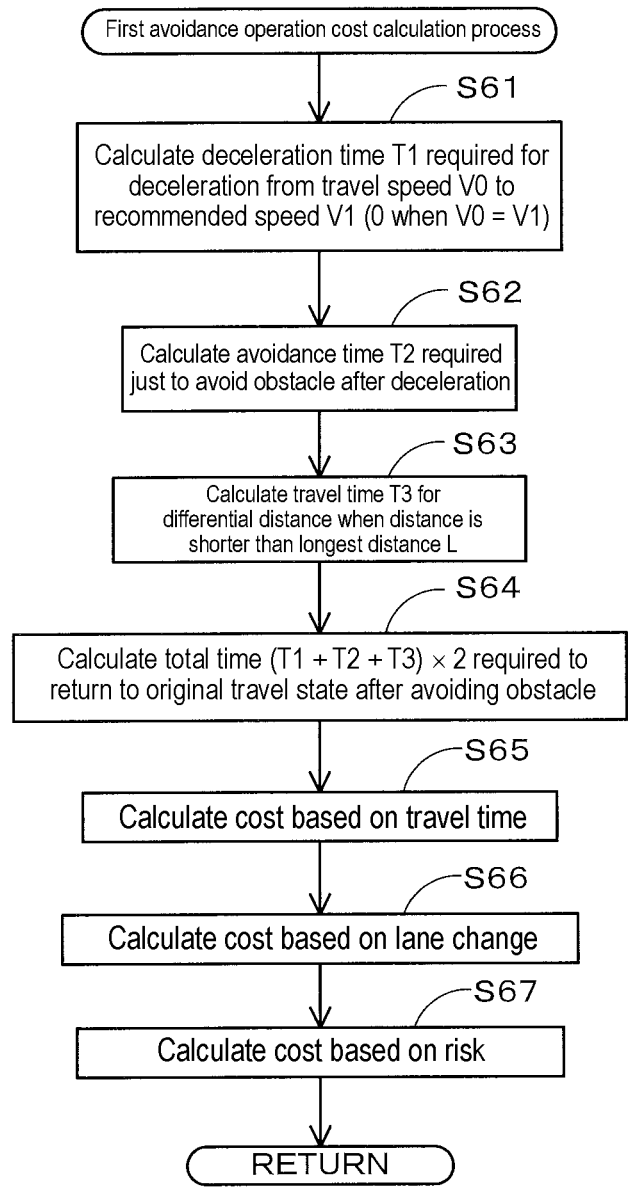
FIG. 20 is a flowchart of a subprocess program of a first avoidance operation cost calculation process.

Next, a subprocess of the first avoidance operation cost calculation process performed at the above-described S48 will be described based on FIG. 20. FIG. 20 is a flowchart of a subprocess program of the first avoidance operation cost calculation process.

First, at S61, the CPU 51 calculates time required for deceleration from the travel speed $V_0$ obtained at the above-described S43 to the recommended speed $V_1$ calculated at the above-describes S51 (hereinafter, referred to as deceleration time T1). Note that the deceleration time T1 is calculated, with an upper limit for forward and backward acceleration allowed for the vehicle upon deceleration being 0.2 G. In addition, when the travel speed $V_0$ is identical to the recommended speed $V_1$, the deceleration time T1 is 0.

Subsequently, at S62, the CPU 51 calculates time required just to avoid the obstacle by performing the avoidance operation (1) after decelerating to the recommended speed $V_1$ (hereinafter, referred to as avoidance time T2). Here, the avoidance time T2 is calculated based on the travel path of the vehicle recommended when the vehicle avoids the obstacle by moving within the lane (FIG. 18) which is calculated at the above-described S53. Namely, time required when the vehicle travels along the calculated travel path at the recommended speed $V_1$ is calculated as the avoidance time T2.

Thereafter, at S63, for a case in which the distance required to avoid the obstacle by performing the avoidance operation (1) which is calculated at the above-described S54 is shorter than the longest distance L, the CPU 51 calculates time required for the vehicle to travel a differential distance therebetween at the travel speed $V_0$ (hereinafter, referred to as travel time T3). Note that when the distance required to avoid the obstacle by performing the avoidance operation (1) which is calculated at the above-described S54 is identical to the longest distance L, the travel time T3 is 0.

Subsequently, at S64, the CPU 51 calculates time obtained by doubling a total of the deceleration time T1 calculated at the above-described S61, the avoidance time T2 calculated at the above-described S62, and the travel time T3 calculated at the above-described S63, as total required time for the vehicle to avoid the obstacle by performing the avoidance operation (1) and return to an original travel state (i.e., return to a state in which the vehicle travels near the center of the lane at the travel speed $V_0$).

Thereafter, at S65, as a cost indicating a burden on a passenger of the vehicle for the above-described avoidance operation (1), the CPU 51 calculates, particularly, a cost based on travel time. Specifically, a difference (sec) between the full travel time ($T_0 \times 2$) calculated at the above-described S47 and the total required time ($(T1+T2+T3) \times 2$) calculated at the above-described S65 is calculated as a cost. Note that the higher the cost calculated at the above-described S65, the longer the time required to avoid the obstacle, indicating a large burden on the passenger.

Then, at S66, as a cost indicating a burden on a passenger of the vehicle for the above-described avoidance operation (1), the CPU 51 calculates, particularly, a cost based on a lane change. Since the avoidance operation (1) is the operation of avoiding the obstacle by the vehicle moving within the lane, it does not involve movement into another lane and it is estimated that a passenger's burden based on a lane change is small, and thus, "0" is calculated as a cost. Note that the higher the cost calculated at the above-described S66, a more difficult operation associated with a lane change is required to avoid the obstacle, indicating a large burden on the passenger.

Then, at S67, as a cost indicating a burden on a passenger of the vehicle for the above-described avoidance operation (1), the CPU 51 calculates, particularly, a cost based on the level of risk. Here, the cost based on the level of risk is calculated based on the road configuration of a road having the obstacle which is obtained at the above-described S42. Specifically, when the road having the obstacle is a road with two or more lanes in each direction, if the vehicle moves to one side of a lane to avoid the obstacle, then there is a possibility of the vehicle approaching a large vehicle traveling in an adjacent lane. Thus, the level of risk is estimated to be medium and "1" is calculated as a cost. On the other hand, when the road having the obstacle is a road with one lane in each direction or with only one lane, even if the vehicle moves to one side of the lane to avoid the obstacle, the possibility of the vehicle approaching another vehicle is very small. Thus, the level of risk is estimated to be low and "0" is calculated as a cost.

A total of the costs calculated at the above-described S65 to S67 is finally calculated as a cost indicating a burden on the passenger of the vehicle for the above-described avoidance operation (1).

Figure 21:
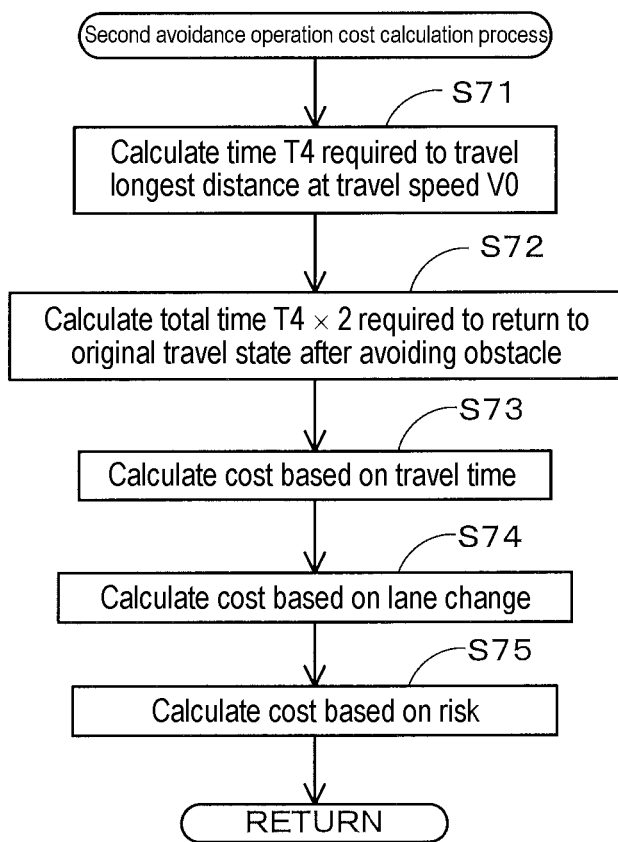
FIG. 21 is a flowchart of a subprocess program of a second avoidance operation cost calculation process.

Next, a subprocess of the second avoidance operation cost calculation process performed at the above-described S49 will be described based on FIG. 21. FIG. 21 is a flowchart of a subprocess program of the second avoidance operation cost calculation process.

First, at S71, the CPU 51 calculates time required to avoid the obstacle by performing the avoidance operation (2) at the travel speed $V_0$ obtained at the above-described S43 (hereinafter, referred to as avoidance time T4). Note that the avoidance time T4 may be calculated such that first, a travel path of the vehicle recommended when the obstacle is avoided by performing the avoidance operation (2) is identified and the avoidance time T4 is calculated from the identified travel path, but even if the clothoid curves shown in FIGS. 18 and 19 are approximated to straight lines, a difference in travel time to be calculated is negligibly small, and thus in the present embodiment, the avoidance time T4 is calculated by approximating a travel path to a straight line. Thus, time required to travel the longest distance L at the travel speed $V_0$ is calculated as the avoidance time T4.

Then, at S72, the CPU 51 calculates time obtained by doubling the avoidance time T4 calculated at the above-described S71, as total required time for the vehicle to avoid the obstacle by performing the avoidance operation (2) and return to an original travel state (i.e., to overcome lane drifting).

Thereafter, at S73, as a cost indicating a burden on a passenger of the vehicle for the above-described avoidance operation (2), the CPU 51 calculates, particularly, a cost based on travel time. Specifically, a difference (sec) between the full travel time ($T_0 \times 2$) calculated at the above-described S47 and the total required time (($T4 \times 2$) calculated at the above-described S72 is calculated as a cost. Note that the higher the cost calculated at the above-described S73, the longer the time required to avoid the obstacle, indicating a large burden on the passenger.

Then, at S74, as a cost indicating a burden on a passenger of the vehicle for the above-described avoidance operation (2), the CPU 51 calculates, particularly, a cost based on a lane change. The avoidance operation (2) is the operation of avoiding the obstacle by the vehicle moving out of the lane, but compared to a lane change, the amount of movement is not large and it is estimated that a passenger's burden based on a lane change is medium, and thus, "1" is calculated as a cost. Note that the higher the cost calculated at the above-described S74, a more difficult operation associated with a lane change is required to avoid the obstacle, indicating a large burden on the passenger.

Furthermore, at S75, as a cost indicating a burden on a passenger of the vehicle for the above-described avoidance operation (2), the CPU 51 calculates, particularly, a cost based on the level of risk. Here, the cost based on the level of risk is calculated based on the road configuration of a road having the obstacle which is obtained at the above-described S42. Specifically, when the road having the obstacle is a road with two or more lanes in each direction, if the vehicle drifts out of its lane to avoid the obstacle, then there is a high possibility of the vehicle approaching another vehicle traveling in a lane into which the vehicle has drifted. Thus, the level of risk is estimated to be high and "2" is calculated as a cost. On the other hand, when the road having the obstacle is a road with one lane in each direction or with only one lane, even if the vehicle drifts out of its lane to avoid the obstacle, the possibility of the vehicle approaching another vehicle is small, but there is a possibility of the vehicle approaching an oncoming vehicle, a pedestrian, etc. Thus, the level of risk is estimated to be medium and "1" is calculated as a cost.

A total of the costs calculated at the above-described S73 to S75 is finally calculated as a cost indicating a burden on the passenger of the vehicle for the above-described avoidance operation (2).

Figure 22:
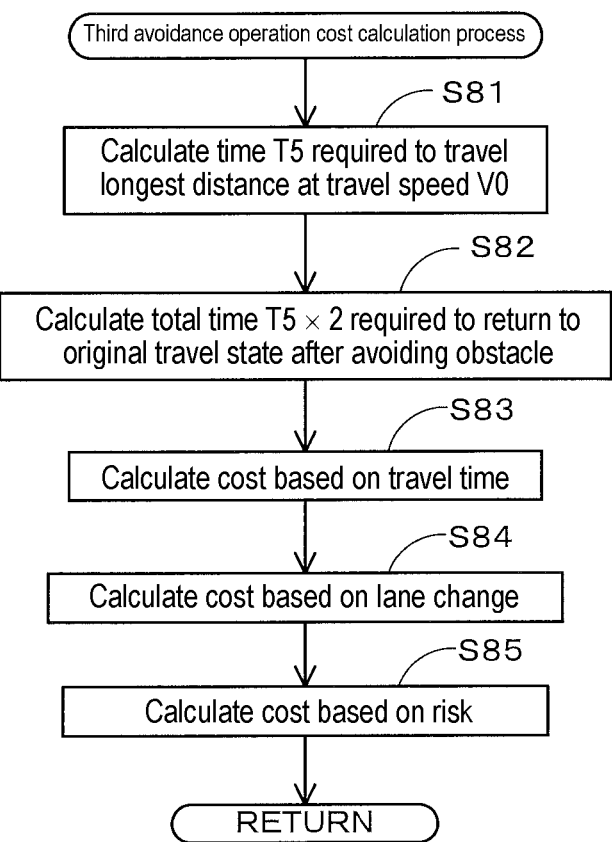
FIG. 22 is a flowchart of a subprocess program of a third avoidance operation cost calculation process.

Next, a subprocess of the third avoidance operation cost calculation process performed at the above-described S50 will be described based on FIG. 22. FIG. 22 is a flowchart of a subprocess program of the third avoidance operation cost calculation process.

First, at S81, the CPU 51 calculates time required to avoid the obstacle by performing the avoidance operation (3) at the travel speed $V_0$ obtained at the above-described S43 (hereinafter, referred to as avoidance time T5). Note that the avoidance time T5 may be calculated such that first, a travel path of the vehicle recommended when the obstacle is avoided by performing the avoidance operation (3) is identified and the avoidance time T5 is calculated from the identified travel path, but even if the clothoid curves shown in FIGS. 18 and 19 are approximated to straight lines, a difference in travel time to be calculated is negligibly small, and thus in the present embodiment, the avoidance time T5 is calculated by approximating a travel path to a straight line. Thus, time required for the vehicle to travel the longest distance L at the travel speed $V_0$ is calculated as the avoidance time T5.

Then, at S82, the CPU 51 calculates time obtained by doubling the avoidance time T5 calculated at the above-described S81, as total required time for the vehicle to avoid the obstacle by performing the avoidance operation (3) and return to an original travel state (i.e., return to an original lane used before the avoidance).

Thereafter, at S83, as a cost indicating a burden on a passenger of the vehicle for the above-described avoidance operation (3), the CPU 51 calculates, particularly, a cost based on travel time. Specifically, a difference (sec) between the full travel time ($T_0 \times 2$) calculated at the above-described S47 and the total required time (($T5 \times 2$) calculated at the above-described S82 is calculated as a cost. Note that the higher the cost calculated at the above-described S83, the longer the time required to avoid the obstacle, indicating a large burden on the passenger.

Then, at S84, as a cost indicating a burden on a passenger of the vehicle for the above-described avoidance operation (3), the CPU 51 calculates, particularly, a cost based on a lane change. The avoidance operation (3) is to allow the vehicle to completely move into another adjacent lane, and thus, it is estimated that a passenger's burden based on a lane change is large, and "2" is calculated as a cost. Note that the higher the cost calculated at the above-described S84, a more difficult operation associated with a lane change is required to avoid the obstacle, indicating a large burden on the passenger.

Furthermore, at S85, as a cost indicating a burden on a passenger of the vehicle for the above-described avoidance operation (3), the CPU 51 calculates, particularly, a cost based on the level of risk. Here, the cost based on the level of risk is calculated based on the road configuration of a road having the obstacle which is obtained at the above-described S42. Specifically, when the road having the obstacle is a road with two or more lanes in each direction, the vehicle leaves its traveling lane to avoid the obstacle, but since the vehicle completely leaves its traveling lane, while an operational burden is large, the possibility of the vehicle approaching another vehicle is small. Thus, the level of risk is estimated to be low and "0" is calculated as a cost. On the other hand, when the road having the obstacle is a road with one lane in each direction, since the vehicle travels in an opposite lane to avoid the obstacle, there is a possibility of the vehicle approaching an oncoming vehicle. Thus, the level of risk is estimated to be high and "2" is calculated as a cost.

A total of the costs calculated at the above-described S83 to S85 is finally calculated as a cost indicating a burden on the passenger of the vehicle for the above-described avoidance operation (3). Thereafter, processing transitions to S30, and recommended avoidance operation which is recommended to avoid the obstacle is selected from among the candidates which are the above-described avoidance operation (1) to (3). Basically, a candidate for avoidance operation with the smallest total of calculated costs is selected as the recommended avoidance operation.

Here, FIGS. 23 and 24 are diagrams showing specific examples of costs that are actually calculated in the above-described first avoidance operation cost calculation process (FIG. 20), second avoidance operation cost calculation process (FIG. 21), and third avoidance operation cost calculation process (FIG. 22).

For example, FIG. 23 shows costs calculated when a road having an obstacle is a road with two lanes in each direction, the lane width is 3.5 m, the vehicle width is 1.8 m, the obstacle occupies an area extending 0.8 m from a left edge of a lane, the travel speed $V_0$ is 50 km/h, and the allowable upper limit acceleration is 0.2 G. In the example shown in FIG. 23, the avoidance operation (1) has the largest total of costs, and the avoidance operation (3) has the smallest total of costs. Thus, the avoidance operation (3) is selected as recommended avoidance operation.

On the other hand, FIG. 24 shows costs calculated when a road having an obstacle is a road with one lane in each direction, the lane width is 3.5 m, the vehicle width is 1.8 m, the obstacle occupies an area extending 0.8 m from a left edge of a lane, the travel speed $V_0$ is 40 km/h, and the allowable upper limit acceleration is 0.2 G. In the example shown in FIG. 24, the avoidance operation (3) has the largest total of costs, and the avoidance operation (1) has the smallest total of costs. Thus, the avoidance operation (1) is selected as recommended avoidance operation.

Figure 25:
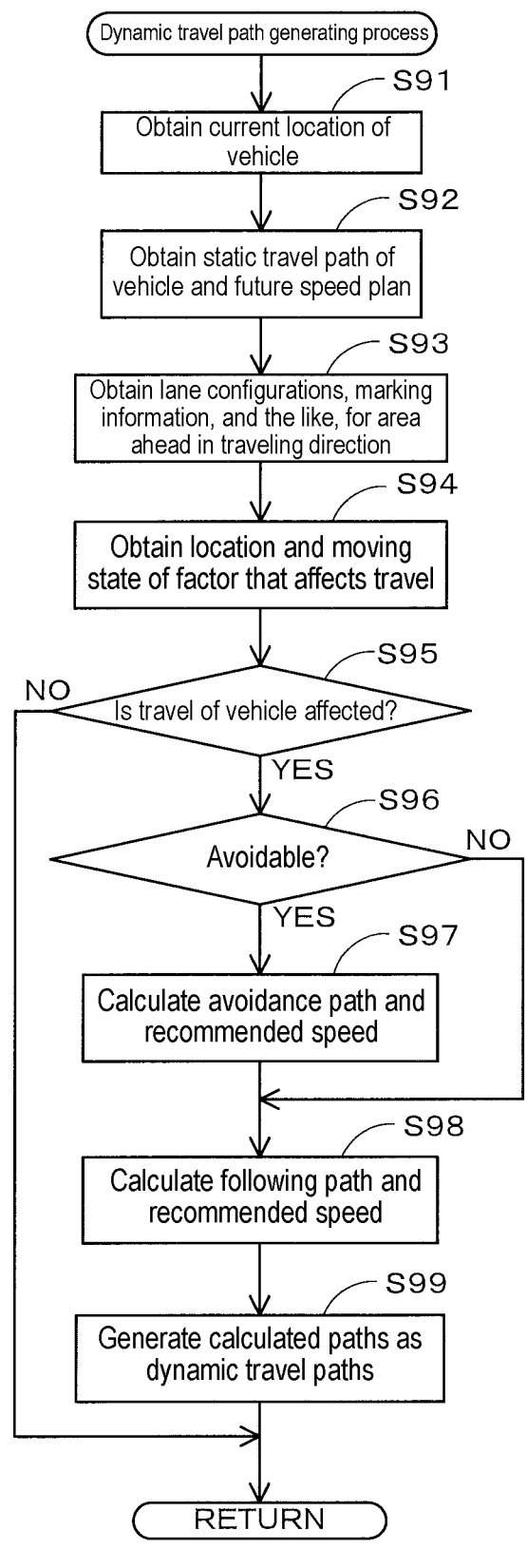
FIG. 25 is a flowchart of a subprocess program of a dynamic travel path generating process.

Next, a subprocess of the dynamic travel path generating process performed at the above-described S6 will be described based on FIG. 25. FIG. 25 is a flowchart of a subprocess program of the dynamic travel path generating process.

First, at S91, the CPU 51 obtains a current location of the vehicle detected by the current location detecting part 31. Note that it is desirable to specifically identify the current location of the vehicle using, for example, high-precision GPS information or a high-precision location technique. Here, the high-precision location technique is a technique in which a white line or road surface painting information captured with a camera installed on the vehicle is detected by image recognition, and furthermore, the detected white line or road surface painting information is checked against, for example, the high-precision map information 16, by which a driving lane or a high-precision vehicle location can be detected. Furthermore, when the vehicle travels on a road having a plurality of lanes, a lane in which the vehicle travels is also identified. Then, at S92, the CPU 51 obtains the static travel path generated at the above-described S3 (i.e., a path where the vehicle is planned to travel in the future) and the speed plan created at the above-described S4 (i.e., planned speeds used by the vehicle in the future).

Then, at S93, the CPU 51 obtains, based on the high-precision map information 16 obtained at the above-described S2, lane configurations, marking information, etc., targeting an area ahead in a traveling direction of the vehicle, particularly, an area around the "factor that affects travel of the vehicle (hereinafter, referred to as affecting factor)" detected at the above-described S5. Note that the lane configurations and marking information obtained at the above-described S93 include information that identifies the number of lanes and how and where the number of lanes increases or decreases when there is an increase or decrease in the number of lanes, etc.

Subsequently, at S94, the CPU 51 obtains, for the affecting factor detected at the above-described S5, a location of the affecting factor at the present time and a moving state (a moving direction and a moving speed) when the affecting factor is moving. Note that the location and moving state of the affecting factor are obtained by performing, for example, image processing on a captured image obtained by capturing a predetermined detection range around the vehicle with the exterior camera 39.

In addition, for example, the real-time location, moving direction, moving speed, etc., of each vehicle traveling on a road across the country may be managed by an external server, and when another vehicle located around the vehicle is an affecting factor, the CPU 51 may obtain, at the above-described S94, the location, moving direction, and moving speed of corresponding another vehicle from the external server.

Thereafter, at S95, the CPU 51 first predicts a future moving trajectory of the affecting factor, based on the current location and moving state of the affecting factor obtained at the above-described S94. Note that when the affecting factor is another vehicle, the prediction may be made taking into account the turn-on/off states of turn signals and brake lights of another vehicle. Furthermore, if the future travel path and speed plan for another vehicle can be obtained by vehicle-to-vehicle communication, etc., then the prediction may be made taking into account the future travel path and speed plan. Thereafter, based on the predicted future moving trajectory of the affecting factor and the static travel path and speed plan for the vehicle obtained at the above-described S92, it is more accurately determined whether the affecting factor affects travel of the vehicle. Specifically, when it is predicted that the vehicle and the affecting factor are located in the same lane at the present time or in the future and a distance therebetween reaches within an appropriate vehicle-to-vehicle distance D, it is determined that the affecting factor affects travel of the vehicle. Note that the appropriate vehicle-to-vehicle distance D is calculated by, for example, the following equation (5):

$$D = \text{vehicle speed of the vehicle} \times 2 \ \text{sec} + \text{vehicle'} \qquad (5)$$
$$\text{s braking distance} - \text{affecting factor's braking}$$
$$\text{distance (note, however, that it is exclusive to a case}$$
$$\text{in which the affecting factor is a moving object)}$$

If it is determined that the affecting factor affects travel of the vehicle (S95: YES), then processing transitions to S96. On the other hand, if it is determined that the affecting factor does not affect travel of the vehicle (S95: NO), then processing transitions to S9 (S7 and S8 are omitted) without generating a dynamic travel path. Note that when the affecting factor is an obstacle that is already determined to be an avoidance target (S26 and S27) upon generating a travel path in the static travel path generating process (FIG. 7), since a travel path for avoiding the obstacle is already generated, basically, it is determined that the affecting factor does not affect travel of the vehicle. Note, however, that this does not apply to, for example, a case in which the location of the obstacle or the area occupied by the obstacle in the lane has changed during a period from the timing of generating a static travel path to the present time.

At S96, the CPU 51 determines whether a new path for the vehicle to avoid the affecting factor and return to the static travel path (i.e., pass the affecting factor) can be generated. Specifically, when the affecting factor and the vehicle are located in the same lane at the present time, for a path where the vehicle makes a lane change to the right to pass the affecting factor in a range in which vehicle speed does not exceed a speed limit, and then makes a lane change to the left to return to an original lane, if a path where the vehicle maintains an appropriate vehicle-to-vehicle distance D or more with the affecting factor can be formed, then it is determined that a new path for the vehicle to avoid the affecting factor and return to the static travel path can be generated. In addition, when the affecting factor and the vehicle are located in different lanes at the present time and the vehicle later moves into the same lane as the affecting factor, for a path where the vehicle passes the affecting factor in a range in which vehicle speed does not exceed a speed limit, and then makes a lane change to the same lane as the affecting factor, if a path where the vehicle maintains an appropriate vehicle-to-vehicle distance D or more with the affecting factor can be formed, then it is determined that a new path for the vehicle to avoid the affecting factor and return to the static travel path can be generated. In the determination process at the above-described S96, the determination is made based on the lane configurations and marking information for an area ahead in the traveling direction of the vehicle which are obtained at the above-described S93, the current location of the vehicle, the future moving trajectory of the affecting factor, and the speed limit for a road.

If it is determined that a new path for the vehicle to avoid the affecting factor and return to the static travel path (i.e., pass the affecting factor) can be generated (S96: YES), then processing transitions to S97. On the other hand, if it is determined that a new path for the vehicle to avoid the affecting factor and return to the static travel path (i.e., pass the affecting factor) cannot be generated (S96: NO), then processing transitions to S98.

At S97, the CPU 51 calculates a path for the vehicle to avoid the affecting factor and return to the static travel path (i.e., pass the affecting factor) (hereinafter, referred to as avoidance path). For example, when the vehicle and the affecting factor are located in the same lane at the present time, as shown in FIG. 26, a path where the vehicle makes a lane change to the right to pass the affecting factor and then makes a lane change to the left to return to an original lane corresponds to an avoidance path.

Figure 26:
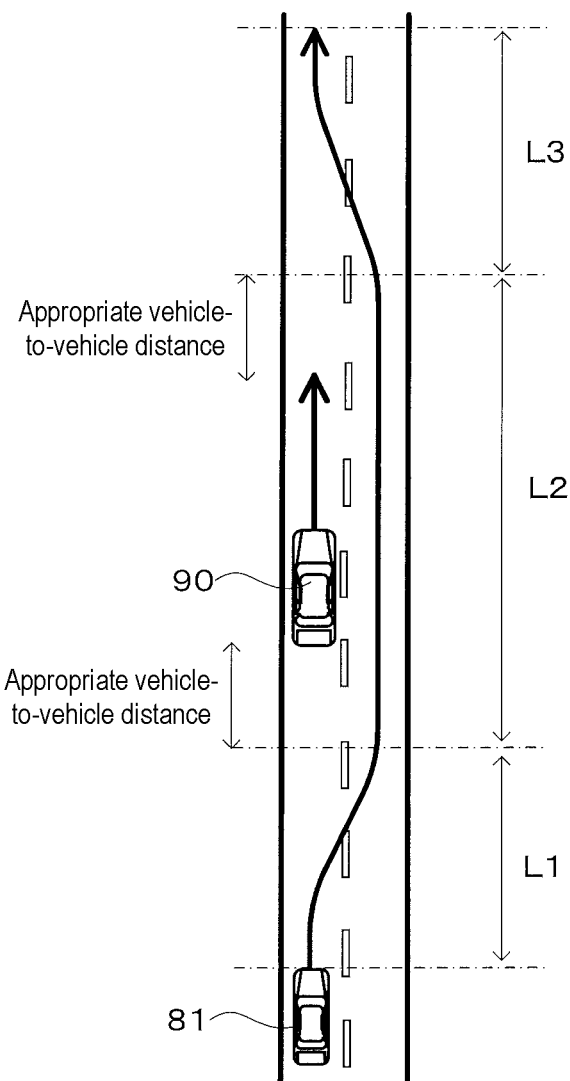
FIG. 26 is a diagram showing an example of an avoidance path which is one of dynamic travel paths.

Here, FIG. 26 shows an example of an avoidance path generated at the above-described S97 when a vehicle 81 travels in a left lane on a road with two lanes in each direction and an affecting factor is a lead vehicle 90 that travels in the same lane as the vehicle 81.

First, in the example shown in FIG. 26, a first path L1 is calculated that is required for the vehicle to move into a right lane by starting a turn of the steering and for the steering position to return to a straight-ahead direction. Note that for the first path L1, a path that is as smooth as possible and has the shortest possible distance required for a lane change is calculated using a clothoid curve on conditions that lateral acceleration (lateral G) occurring upon making a lane change does not interfere with autonomous driving assistance and does not exceed an upper limit value (e.g., 0.2 G) at which a passenger of the vehicle is not given discomfort, the lateral G being calculated based on the current vehicle speed of the vehicle. In addition, maintaining an appropriate vehicle-to-vehicle distance D or more between the vehicle and the lead vehicle 90 is another condition.

Then, a second path L2 is calculated where the vehicle travels in the right lane with a speed limit being an upper limit, to pass the lead vehicle 90 and travels until an appropriate vehicle-to-vehicle distance D or more with the lead vehicle 90 is obtained. Note that the second path L2 is basically a straight path, and the length of the path is calculated based on the vehicle speed of the lead vehicle 90 and the speed limit for the road.

Subsequently, a third path L3 is calculated that is required for the vehicle to return to the left lane by starting a turn of the steering and for the steering position to return to the straight-ahead direction. Note that for the third path L3, a path that is as smooth as possible and has the shortest possible distance required for a lane change is calculated using a clothoid curve on conditions that lateral acceleration (lateral G) occurring upon making a lane change does not interfere with autonomous driving assistance and does not exceed an upper limit value (e.g., 0.2 G) at which a passenger of the vehicle is not given discomfort, the lateral G being calculated based on the current vehicle speed of the vehicle. In addition, maintaining an appropriate vehicle-to-vehicle distance D or more between the vehicle and the lead vehicle 90 is another condition.

In addition, at the above-described S97, a recommended speed for the vehicle at which the vehicle travels along the above-described avoidance path is also calculated. For the recommended speed for the vehicle, with a speed limit being an upper limit, a speed at which lateral acceleration (lateral G) occurring in the vehicle upon making a lane change does not interfere with autonomous driving assistance and does not exceed an upper limit value (e.g., 0.2 G) at which a passenger of the vehicle is not given discomfort is set as the recommended speed. For example, the calculation is performed based on the curvature of the avoidance path, the speed limit, etc.

Figure 27:
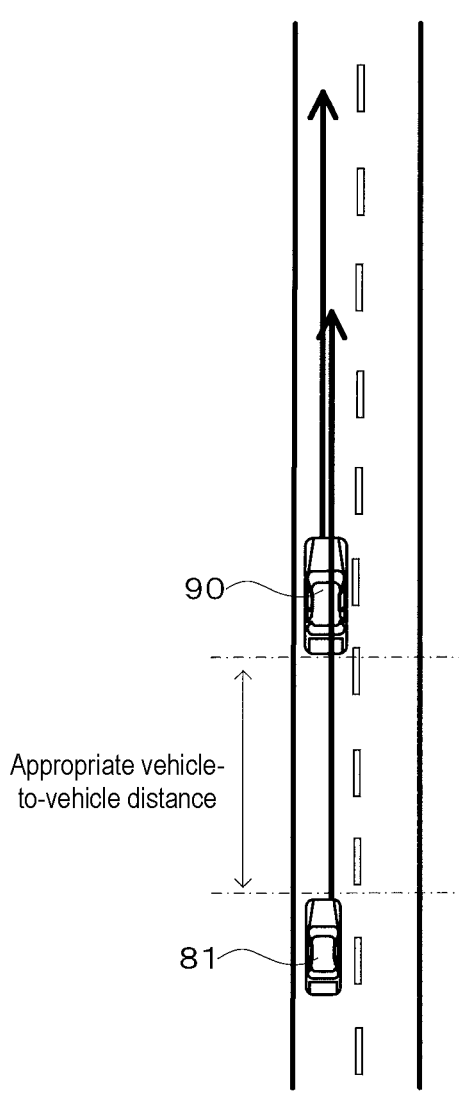
FIG. 27 is a diagram showing an example of a following path which is one of dynamic travel paths.

On the other hand, at S98, the CPU 51 calculates a path for the vehicle to travel following (or side by side with) the affecting factor (hereinafter, referred to as following path). Specifically, when the vehicle and the affecting factor are located in the same lane at the present time, as shown in FIG. 27, a path where the vehicle 81 continues to travel in the current lane without making a lane change, to follow the affecting factor (e.g., the lead vehicle 90) corresponds to a following path. Note that the following path is basically the same path as the static travel path. Note, however, that since the vehicle-to-vehicle distance between the vehicle and the affecting factor needs to be appropriately maintained, as will be described later, the speed plan is modified (S8).

In addition, at the above-described S98, a recommended speed for the vehicle at which the vehicle travels along the above-described following path is also calculated. For the following speed for the vehicle, with a speed limit being an upper limit, a speed at which an appropriate vehicle-to-vehicle distance D or more is maintained between the vehicle and the affecting factor ahead of the vehicle is set as the recommended speed. Note that the appropriate vehicle-to-vehicle distance D is calculated based on the above-described equation (5).

Thereafter, at S99, the CPU 51 generates the avoidance path calculated at the above-described S97 (only when the avoidance path is calculated) and the following path calculated at the above-described S98, as dynamic travel paths, taking into account road conditions around the vehicle, the dynamic travel paths being travel paths recommended for the vehicle to travel along on a road included in the planned travel route.

The dynamic travel paths generated at the above-described S99 are stored in the flash memory 54, etc., as assistance information used for autonomous driving assistance.

Figure 28:
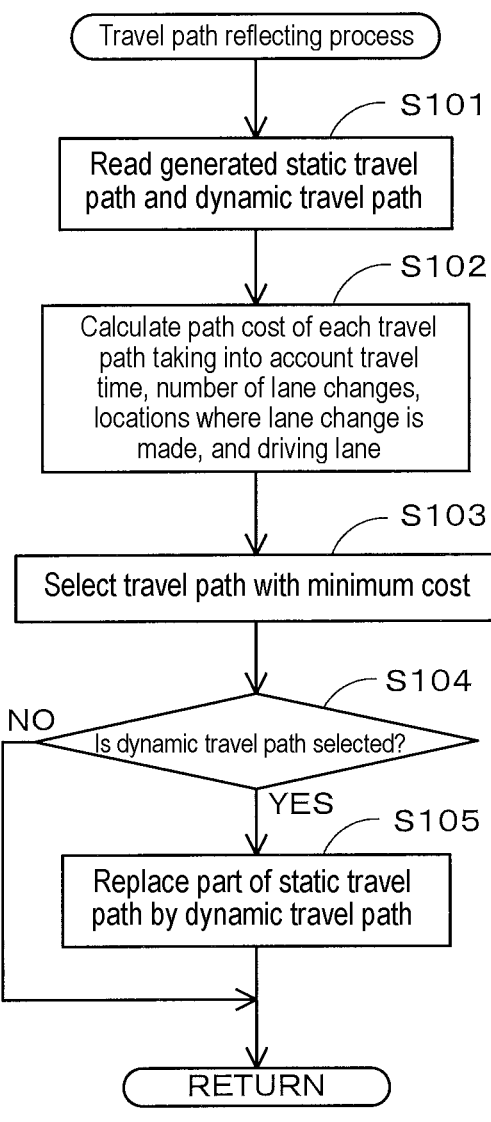
FIG. 28 is a flowchart of a subprocess program of a travel path reflecting process.

Next, a subprocess of the travel path reflecting process performed at the above-described S7 will be described based on FIG. 28. FIG. 28 is a flowchart of a subprocess program of the travel path reflecting process.

First, at S101, the CPU 51 reads the static travel path generated at the above-described S3 and the dynamic travel path generated at the above-described S6 from a storage medium such as the flash memory 54.

Subsequently, at S102, for each travel path read at the above-described S101, the CPU 51 calculates, for each travel path, a path cost indicating the level of appropriateness as a travel path of the vehicle. Here, the path cost is calculated taking into account at least one or more of (a) travel time (average vehicle speed), (b) the number of lane changes, (c) locations where a lane change is made, and (d) a driving lane. Specifically, the calculation is performed based on the following conditions.

For (a) "travel time (average vehicle speed)", a higher path cost is calculated for a travel path with longer travel time (i.e., a lower average vehicle speed). Note that an average vehicle speed for the static travel path is identified based on the speed plan created at the above-described S4. On the other hand, for the dynamic travel path, an average vehicle speed is identified based on the recommended speed calculated at the above-described S97 or S98.

For (b) "the number of lane changes", a higher path cost is calculated for a travel path with a larger number of lane changes.

For (c) "locations where a lane change is made", when a plurality of lane changes are made, a higher path cost is calculated for a travel path with a shorter interval between lane changes. In addition, for a travel path where a lane change is made within an area before and at a predetermined distance from an intersection (e.g., 700 m for general roads and 2 km for expressways), a path cost is added.

For (d) "a driving lane", a higher path cost is calculated for a travel path with a longer travel distance of a passing lane.

Note, however, that regardless of the above-described conditions (a) to (d), for a travel path that is determined to cause the vehicle to collide with the affecting factor detected at the above-described S5, the cost is infinity.

Thereafter, at S103, the CPU 51 compares the path costs for the respective travel paths which are calculated at the above-described S102, to select one of the static travel path and the dynamic travel path that has a smaller value of the path cost, as a travel path recommended for the vehicle to travel along.

Then, at S104, the CPU 51 determines whether the dynamic travel path has been selected at the above-described S103.

If it is determined at the above-described S103 that the dynamic travel path has been selected (S104: YES), then processing transitions to S105.

At S105, the CPU 51 replaces the static travel path by the dynamic travel path, targeting a reconstructed section in which the selected dynamic travel path is generated. Note that when the static travel path in the reconstructed section is replaced by the dynamic travel path, basically, the starting point and end point of the dynamic travel path are connected to the static travel path, but depending on the route selected at the above-described S97 or S98, the end point of the dynamic travel path may not be connected to the static travel path. In such a case, a static travel path may be newly generated with the end point of the dynamic travel path being a starting point of the static travel path, or a dynamic travel path may be repeatedly generated at regular intervals until the dynamic travel path is connected to the static travel path.

Thereafter, assistance travel by autonomous driving assistance is performed based on the static travel path whose reconstructed section is replaced by the dynamic travel path (S9 and S10).

On the other hand, if it is determined at the above-described S103 that the static travel path has been selected (S104: NO), then processing transitions to S8 without replacement by the dynamic travel path.

Here, when the static travel path is selected as a travel path with a small value of the path cost, the path is one where the vehicle continues to travel in the current lane without making a lane change, to follow the affecting factor. Thus, replacement by the dynamic travel path is not performed, but in the following path, the vehicle-to-vehicle distance between the vehicle and the affecting factor needs to be appropriately maintained, and thus, the speed plan is modified (S8).

As described in detail above, the navigation device 1 and a computer program executed by the navigation device 1 according to the present embodiment obtain a planned travel route on which the vehicle travels (S1), obtain information on an obstacle that is present on a portion of the planned travel route outside a detection range of a camera or a sensor and that becomes a factor that hinders travel of the vehicle (S26), generate a travel path recommended to avoid the obstacle upon traveling on the planned travel route, using map information (16) including information about markings and the information on an obstacle (S29 to S32), and provide driving assistance for the vehicle, based on the generated travel path (S9 and S10), and thus, when an obstacle which becomes a factor that hinders travel of the vehicle is present on a planned travel route of the vehicle, it becomes possible to generate a recommended travel path for avoiding the obstacle, at a stage at which the vehicle is located away from the obstacle. As a result, it becomes possible to provide appropriate driving assistance that does not place a burden on a passenger of the vehicle.

In addition, upon generating a travel path recommended to avoid the obstacle, a cost indicating a burden on the passenger is calculated for a plurality of candidates for avoidance operation for avoiding the obstacle, using the map information (16) including information about markings and the information on an obstacle, the plurality of candidates including first avoidance operation for avoiding the obstacle by the vehicle traveling in a lane in which the obstacle is located, and moving within the lane, and second avoidance operation for avoiding the obstacle by the vehicle moving out of the lane in which the obstacle is located (S29), the calculated costs are compared to select avoidance operation recommended to avoid the obstacle from among the plurality of candidates for avoidance operation (S30), and a travel path recommended for the vehicle to travel along on a road included in the planned travel route is generated in accordance with the selected avoidance operation (S32), and thus, when an obstacle which becomes a factor that hinders travel of the vehicle is present on a planned travel route of the vehicle, it becomes possible to select recommended avoidance operation for avoiding the obstacle at a stage at which the vehicle is located away from the obstacle, and generate a travel path based on the selected avoidance operation.

In addition, the second avoidance operation includes avoidance operation for avoiding the obstacle by the vehicle moving out of the lane in which the obstacle is located such that a part of a vehicle body drifts out of the lane; and avoidance operation for avoiding the obstacle by the vehicle changing its traveling lane from the lane in which the obstacle is located to an adjacent lane, and thus, it becomes possible to have, as candidates, various types of avoidance operation that can be taken by the vehicle to avoid the obstacle, and select recommended avoidance operation for avoiding the obstacle from among the candidates. As a result, it becomes possible to select more appropriate avoidance operation for avoiding the obstacle.

In addition, for each of the plurality of candidates for avoidance operation, a cost is added that is determined based on the length of travel time required for the vehicle to start the avoidance operation for avoiding the obstacle, avoid the obstacle, and return to an original travel state (S65, S73, and S83), and thus, it becomes possible to accurately reflect a passenger's burden in the cost, based on travel time required to avoid the obstacle.

Note that the present disclosure is not limited to the above-described embodiment, and it is, of course, possible to make various modifications and alterations thereto without departing from the spirit and scope of the present invention.

For example, in the present embodiment, the server device 4 collects, as probe information, obstacle information about obstacles which become factors that hinder travel of vehicles (FIG. 3) from vehicles having detected the obstacles, but only sensor information may be collected from vehicles, and the server device may generate obstacle information from the collected sensor information. In addition, the server device 4 may obtain obstacle information generated by an external center other than the information delivery center 3.

In addition, in the present embodiment, a static travel path that is finally generated is information that identifies a specific path (a set of coordinates and lines) where the vehicle travels, but such a level of information that does not identify a specific path but can identify roads and lanes where the vehicle is to travel may be obtained.

In addition, in the present embodiment, an obstacle which becomes a factor that hinders travel of the vehicle is a parked vehicle parked on a road, but the obstacle may be any other thing which becomes a factor that hinders travel of the vehicle. In addition, the obstacles may include not only stationary things but also moving things.

In addition, in the present embodiment, a lane network is generated using the high-precision map information 16 (S23), but a lane network that targets roads across the country may be stored in advance in a DB, and the lane network may be read from the DB as necessary.

In addition, in the present embodiment, high-precision map information included in the server device 4 includes both information about the lane configurations of roads (lane-by-lane road configurations, curvatures, lane widths, etc.) and information about markings (centerlines, lane lines, edge lines, guidelines, etc.) painted on the roads, but may include only the information about markings or may include only the information about the lane configurations of roads. For example, even if only the information about markings is included, it is possible to estimate information corresponding to the information about the lane configurations of roads, based on the information about markings. In addition, even if only the information about the lane configurations of roads is included, it is possible to estimate information corresponding to the information about markings, based on the information about the lane configurations of roads. In addition, the "information about markings" may be information that identifies the types or layout of markings themselves that mark off lanes, or may be information that identifies whether a lane change can be made between adjacent lanes, or may be information that directly or indirectly identifies the configurations of lanes.

In addition, in the present embodiment, when an affecting factor that affects travel of the vehicle has been detected, a dynamic travel path is generated and a comparison is made between the path costs of an existing static travel path and the newly generated dynamic travel path (S102 and S103), and only when it is determined that the dynamic travel path is recommended, the static travel path is replaced by the dynamic travel path (S105), but when a dynamic travel path is generated, a static travel path may always be replaced by the dynamic travel path.

In addition, in the present embodiment, as means for reflecting a dynamic travel path in a static travel path, a part of the static travel path is replaced by the dynamic travel path (S9), but instead of replacement, the static travel path may be modified to approximate to the dynamic travel path.

In addition, the present embodiment describes that autonomous driving assistance for performing autonomous travel independently of user's driving operations refers to control, by the vehicle control ECU 40, of all of an accelerator operation, a brake operation, and a steering wheel operation which are operations related to the behavior of the vehicle among vehicle operations. However, the autonomous driving assistance may refer to control, by the vehicle control ECU 40, of at least one of an accelerator operation, a brake operation, and a steering wheel operation which are operations related to the behavior of the vehicle among vehicle operations. On the other hand, it is described that manual driving by user's driving operations refers to performing, by the user, of all of an accelerator operation, a brake operation, and a steering wheel operation which are operations related to the behavior of the vehicle among vehicle operations.

In addition, driving assistance of the present disclosure is not limited to autonomous driving assistance related to autonomous driving of the vehicle. For example, it is also possible to provide driving assistance by displaying the static travel path identified at the above-described S5 or the dynamic travel path generated at the above-described S8 on a navigation screen and providing guidance using voice, a screen, etc. (e.g., guidance on a lane change or guidance on a recommended vehicle speed). In addition, user's driving operations may be assisted by displaying a static travel path or a dynamic travel path on a navigation screen.

In addition, travel by manual driving may be performed in normal times, and only when an obstacle is avoided, travel by autonomous driving may be performed, by which assistance for user's driving operations may be provided.

In addition, in the present embodiment, a configuration is adopted in which the autonomous driving assistance program (FIG. 4) is executed by the navigation device 1, but a configuration may be adopted in which the autonomous driving assistance program is executed by an in-vehicle device other than the navigation device 1 or by the vehicle control ECU 40. In that case, a configuration is adopted in which the in-vehicle device or the vehicle control ECU 40 obtains a current location of the vehicle, map information, etc., from the navigation device 1 or the server device 4. Furthermore, the server device 4 may perform some or all of the steps of the autonomous driving assistance program (FIG. 4). In that case, the server device 4 corresponds to a driving assistance device of the present application.

In addition, aspects of the present disclosure can also be applied to mobile phones, smartphones, tablet terminals, personal computers, etc. (hereinafter, referred to as portable terminals, etc.) in addition to navigation devices. In addition, aspects of the present disclosure can also be applied to a system including a server and a portable terminal, etc. In that case, a configuration may be adopted in which each step of the above-described autonomous driving assistance program (see FIG. 4) is performed by either one of the server and the portable terminal, etc. Note, however, that when aspect of the present disclosure is applied to a portable terminal, etc., a vehicle that can provide autonomous driving assistance and the portable terminal, etc. need to be connected to each other such that they can communicate with each other (it does not matter whether they are connected by wire or wirelessly).

REFERENCE SIGNS LIST

1: Navigation device, 2: Driving assistance system, 3: Information delivery center, 4: Server device, 5: Vehicle, 14: Obstacle information DB, 16: High-precision map information, 33: Navigation ECU, 40: Vehicle control ECU, 51: CPU, 75: Lane node, 76: Lane link, 81: Vehicle, and 82: Obstacle

The invention claimed is:

1. A driving assistance device comprising:
a memory storing instructions; and at least one processor configured to execute the stored instructions to implement: a road conditions obtaining unit for obtaining road conditions in a predetermined detection range around a vehicle; a planned travel route obtaining unit for obtaining a planned travel route on which the vehicle travels; an obstacle information obtaining unit for obtaining information on an obstacle that is present on a portion of the planned travel route outside the predetermined detection range and that becomes a factor that hinders vehicular travel; a travel path generating unit for generating a travel path, targeting a region including an area outside the predetermined detection range, and using map information including information about markings and the information on the obstacle, the travel path being recommended to avoid the obstacle upon traveling on the planned travel route; and a driving assistance unit for providing driving assistance for the vehicle, based on the travel path generated by the travel path generating unit, wherein the travel path generating unit further includes: a cost calculating unit for calculating costs for a plurality of candidates for avoidance operation for avoiding the obstacle, the plurality of candidates including first avoidance operation for avoiding the obstacle by the vehicle traveling in a lane in which the obstacle is located, and moving within the lane, and second avoidance operation for avoiding the obstacle by the vehicle moving out of the lane in which the obstacle is located; and an avoidance operation selecting unit for selecting avoidance operation recommended to avoid the obstacle from among the plurality of candidates for avoidance operation, by comparing the costs calculated by the cost calculating unit, and the travel path is generated for a road included in the planned travel route, in accordance with avoidance operation selected by the avoidance operation selecting unit, and control is performed to allow the vehicle to travel along the generated travel path.

2. The driving assistance device according to claim 1, wherein
the second avoidance operation includes:
an avoidance operation for avoiding the obstacle by the vehicle moving out of the lane in which the obstacle is located such that a part of the vehicle body drifts out of the lane; and
an avoidance operation for avoiding the obstacle by the vehicle changing a traveling lane of the vehicle from the lane in which the obstacle is located to an adjacent lane.

3. The driving assistance device according to claim 1, wherein the cost calculating unit adds, for each of the plurality of candidates for avoidance operation, a cost determined based on a length of travel time required for the vehicle to start the avoidance operation for avoiding the obstacle, avoid the obstacle, and return to an original travel state.

4. A non-transitory computer readable medium storing a computer program for causing a computer to function as: a road conditions obtainer for obtaining road conditions in a predetermined detection range around a vehicle; a planned travel route obtainer for obtaining a planned travel route on which the vehicle travels; an obstacle information obtainer for obtaining information on an obstacle that is present on a portion of the planned travel route outside the predetermined detection range and that becomes a factor that hinders travel of the vehicle; travel path generator for generating a travel path, targeting a region including an area outside the predetermined detection range, and using map information including information about markings and the information on the obstacle, the travel path being recommended to avoid the obstacle upon traveling on the planned travel route; and driving assistor for providing driving assistance for the vehicle, based on the travel path generated by the travel path generator, wherein the travel path generator further includes: a cost calculator for calculating costs for a plurality of candidates for avoidance operation for avoiding the obstacle, the plurality of candidates including first avoidance operation for avoiding the obstacle by the vehicle traveling in a lane in which the obstacle is located, and moving within the lane, and second avoidance operation for avoiding the obstacle by the-a vehicle moving out of the lane in which the obstacle is located; and an avoidance operation selector for selecting avoidance operation recommended to avoid the obstacle from among the plurality of candidates for avoidance operation, by comparing the costs calculated by the cost calculator, and the travel path is generated for a road included in the planned travel route, in accordance with avoidance operation selected by the avoidance operation selector, and control is performed to allow the vehicle to travel along the generated travel path.

* * * * *